US012441017B2

(12) United States Patent
Vorhis et al.

(10) Patent No.: US 12,441,017 B2
(45) Date of Patent: Oct. 14, 2025

(54) FIXED BLADE KNIFE WITH COMBINED HANDLE/SHEATH

(71) Applicants: Daniel J. Vorhis, Freeland, WA (US); Don Horton, Seattle, WA (US)

(72) Inventors: Daniel J. Vorhis, Freeland, WA (US); Don Horton, Seattle, WA (US)

( * ) Notice: Subject to any disclaimer, the term of this patent is extended or adjusted under 35 U.S.C. 154(b) by 0 days.

(21) Appl. No.: 17/409,680

(22) Filed: Aug. 23, 2021

(65) Prior Publication Data

US 2024/0300127 A1 Sep. 12, 2024

Related U.S. Application Data

(60) Provisional application No. 63/205,772, filed on Jan. 7, 2021.

(51) Int. Cl.
*B26B 29/02* (2006.01)
*B26B 3/06* (2006.01)

(52) U.S. Cl.
CPC .............. *B26B 29/025* (2013.01); *B26B 3/06* (2013.01)

(58) Field of Classification Search
CPC ........... B26B 29/025; B26B 3/06; B26B 1/08; B26B 5/001; B26B 11/006; B26B 5/003; B26B 5/00; B26B 29/02; B23D 49/10; B23D 51/10; A47J 17/02; A61B 2017/32113
USPC ........................................................... 30/162
See application file for complete search history.

(56) References Cited

U.S. PATENT DOCUMENTS

| | | | | | |
|---|---|---|---|---|---|
| 719,797 | A | * | 2/1903 | Heller | B26B 5/006 279/86 |
| 997,683 | A | * | 7/1911 | Lutz, Jr. | B26B 3/02 30/342 |
| 1,434,388 | A | * | 11/1922 | Hughes | B26B 1/08 30/162 |
| 1,948,623 | A | * | 2/1934 | Louderback | B26B 5/006 30/162 |
| 2,640,260 | A | * | 6/1953 | Taylor | B26B 1/08 30/162 |
| 2,676,406 | A | * | 4/1954 | Hoke | B26B 5/00 30/342 |
| 2,736,960 | A | * | 3/1956 | Armstrong | B26B 5/006 30/162 |
| 2,820,291 | A | | 1/1958 | Philippar | |
| 3,755,893 | A | * | 9/1973 | Nagaki | B26B 1/08 30/154 |
| 3,906,626 | A | * | 9/1975 | Riuli | A61B 17/3213 30/162 |
| 4,023,271 | A | * | 5/1977 | Di Franco | B26B 11/00 7/110 |
| 4,570,342 | A | * | 2/1986 | Baum | B26B 5/006 30/162 |
| 4,606,123 | A | | 8/1986 | Wrench | |
| 4,630,373 | A | * | 12/1986 | Staurseth | B23D 49/14 30/162 |

(Continued)

*Primary Examiner* — Jonathan G Riley
(74) *Attorney, Agent, or Firm* — FisherBroyles, LLP; Jason Pass; Craig W. Mueller

(57) ABSTRACT

Various disclosed embodiments include a knife assembly that includes a knife member having a blade portion and a tang portion. The knife assembly also including a handle member configured to be slidable from a knife position. At least a portion of the blade portion extends out of the handle member, to a storage position and the blade portion is substantially concealed by the handle member.

14 Claims, 21 Drawing Sheets

(56) References Cited

U.S. PATENT DOCUMENTS

| | | | | | |
|---|---|---|---|---|---|
| 4,646,440 | A * | 3/1987 | Decker | B26B 5/00 30/335 |
| 4,651,419 | A | 3/1987 | Reed, Jr. | |
| D355,106 | S | 2/1995 | Yoshimoto | |
| 5,511,261 | A * | 4/1996 | Collins | B25F 1/04 30/162 |
| 5,584,123 | A * | 12/1996 | Chi | B26B 11/00 30/162 |
| 5,966,816 | A | 10/1999 | Roberson | |
| 6,006,433 | A * | 12/1999 | Baltazar | B26B 5/001 30/162 |
| 6,161,290 | A | 12/2000 | Takamasa | |
| 7,124,510 | B2 | 10/2006 | Frazer | |
| D592,033 | S | 5/2009 | Bloch | |
| 10,632,633 | B2 | 4/2020 | Bloch et al. | |
| 2003/0200661 | A1* | 10/2003 | Okada | B26B 5/002 30/162 |
| 2006/0207102 | A1* | 9/2006 | Bezold | B26B 1/08 30/162 |
| 2009/0241345 | A1* | 10/2009 | Huang | B26B 5/001 30/162 |
| 2013/0055573 | A1* | 3/2013 | Huhtala | B26B 1/08 30/151 |
| 2023/0202061 | A1* | 6/2023 | Xu | B26B 1/08 30/162 |
| 2024/0001570 | A1* | 1/2024 | Dovel | B26B 5/003 |

* cited by examiner

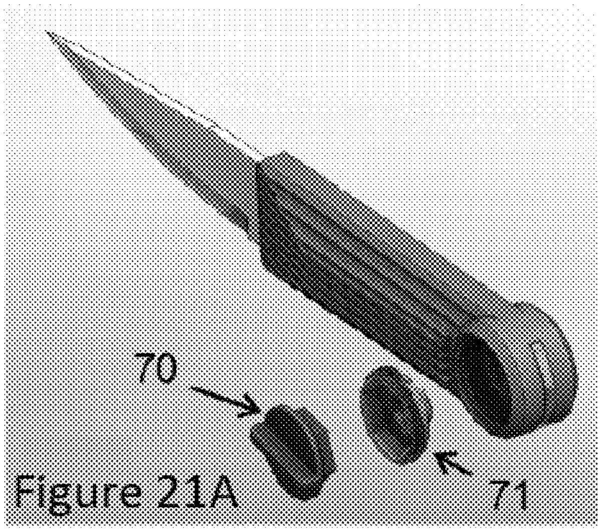
Figure 21A
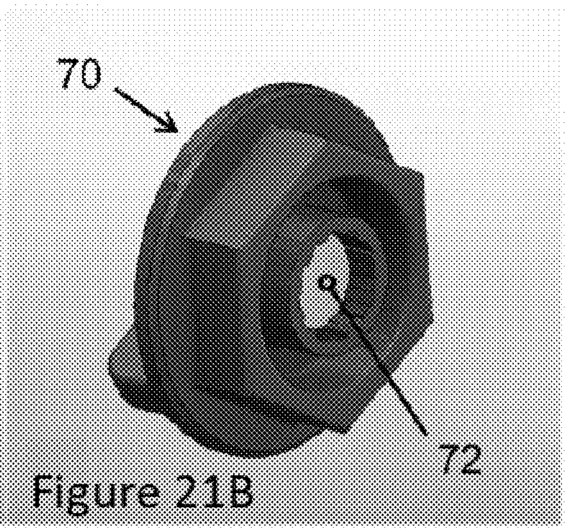
Figure 21B
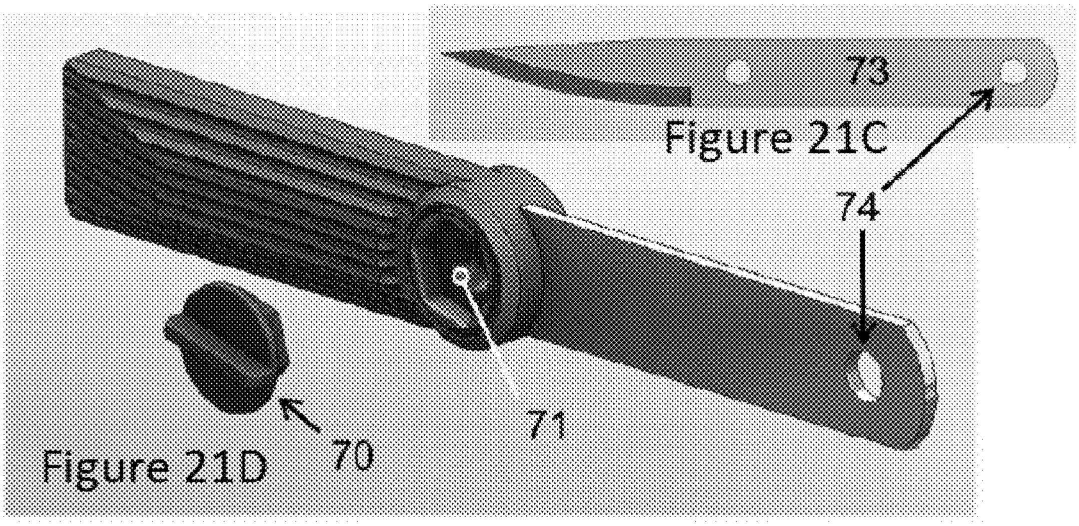
Figure 21C
Figure 21D
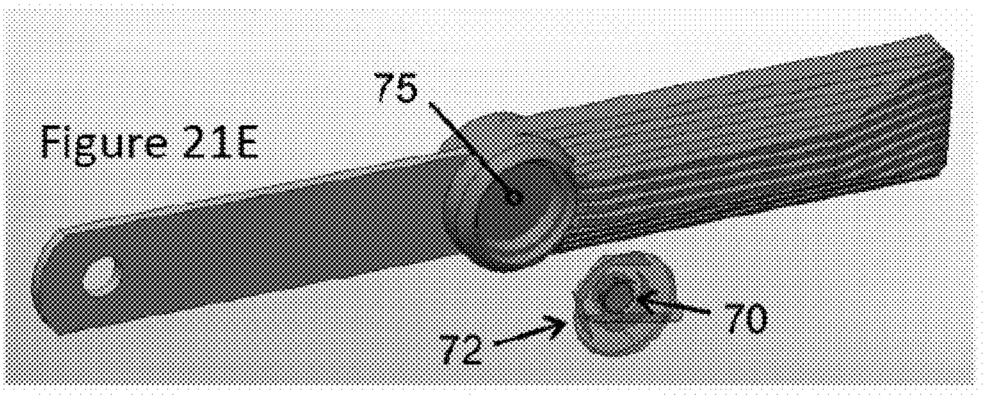
Figure 21E

FIXED BLADE KNIFE WITH COMBINED HANDLE/SHEATH

REFERENCE TO RELATED APPLICATIONS

This application claims priority to U.S. Provisional Application No. 63/205,772 filed on Jan. 7, 2021, entitled FIXED BLADE KNIFE WITH COMBINED HANDLE/SHEATH to Inventor Dan Vorhis, the entirety of which is herein incorporated by reference.

FIELD OF THE INVENTION

The present disclosure relates generally to the field of knives, and specifically to means of shielding a knife blade, and protecting a user from accidental cuts and other damage to person and property.

BACKGROUND

Many people carry a small knife in their pocket or purse, or attached to a belt or pocket corner via a clip attached to the knife's encasement. An easily accessible knife provides a convenient way to open a box or bag, cut twine or tape, pry off a lid, or perform a myriad of other uses. Knives that are carried everyday are often referred to as "everyday carry", or "EDC" knives.

The most commonly used EDC knife is the folding or "pocket" knife. The blade of the folding knife pivots out of an encasement that is part of the knife assembly. The encasement, when the blade is folded out for use, then serves as the knife's handle. When putting the knife back in a pocket, the blade is pivoted back inside the encasement/handle, which now shields the sharp edge and point of the blade.

Folding knives have been in use since the late bronze age. They have features and design advantages which account for their great utility and popularity over the centuries. They also share a common flaw. The pivot point between the blade and the encasement/handle becomes worn, which eventually leads to an unreliable, wobbly joint of the handle and blade. Then, as the blade bends, or a handle fails to support the blade under strain, there is a chance of resulting injury. Generally, a folding knife is never as robust as a knife of similar quality that doesn't fold.

Of course, "non-folding", aka "straight" or "fixed-blade" knives exist, wherein the knife handle and the blade are a single piece of metal (or, rarely, ceramic or some other material). The "tang" of a knife is a projection or extension of the blade that extends partially or fully into (or becomes) the handle of the knife. A fixed-blade knife is essentially one, un-jointed piece of metal, making up both the blade and usually the interior portion of the handle, or sometimes, the entire handle. Such knives do not share the "worn pivot" problem, as the blade and handle do not fold. The blade of the fixed-blade knife often includes a "sheath", or covering, to protect the blade and protect the user from accidental mishap. Sheathes also often serve to allow the user to hang the protected knife conveniently on a belt, for example.

Another class of small knives—which include "switch-blades", OTF ("out-the-front") knives, and "butterfly" knives—are considered martial or fighting knives. Such "fighting" knives often share the "worn pivot" or "loose joint" weakness with any knife wherein the blade is separate from—yet mechanically joined to—the knife handle.

There exist both folding and fixed-blade knives designed to be accessed, removed from their sheath if necessary, opened and closed if necessary, with one hand. For example, if a user happens to be carrying a box (which requires opening) under one arm, such knives are designed to be retrieved easily from pocket or sheath, opened (if the knife is a folding type), used to open the box, and returned to sheath or pocket; all tasks performed with one hand only. This feature is very worthwhile for any knife that is carried for everyday use.

Disclosed here are a number of innovative knife designs including a variety of functions including EDC, hunting, culinary, which solve various deficiencies of conventional knives.

BRIEF SUMMARY

In an illustrative embodiment, a knife assembly includes a knife member having a blade portion and a tang portion. The knife assembly also including a handle member configured to be slidable from a knife position. At least a portion of the blade portion extends out of the handle member, to a storage position and the blade portion is substantially concealed by the handle member.

In another illustrative embodiment, a knife assembly includes a knife member having a blade portion and a tang portion. The knife assembly also includes a handle member configured to be movable from a knife position. At least a portion of the blade portion extends out of the handle member, to a storage position where the blade portion is substantially concealed by the handle member and the tang portion extends out of the handle member.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIG. 21A is a rear perspective view of a knife of another embodiment of the present invention.

FIG. 21B is a screw key used by the embodiment shown in FIG. 21A.

FIG. 21C is a tang used by the embodiment shown in FIG. 21A.

FIG. 21D is a perspective view showing the knife of FIG. 21A in a second position of use.

FIG. 21E is another perspective view showing the knife of FIG. 21A in a second position of use.

FIG. 21E is another perspective view showing the knife of FIG. 21A in a second position of use.

Like reference symbols in the various drawings generally indicate like elements.

Like reference symbols in the various drawings generally indicate like elements.

DETAILED DESCRIPTION

Figure 1:
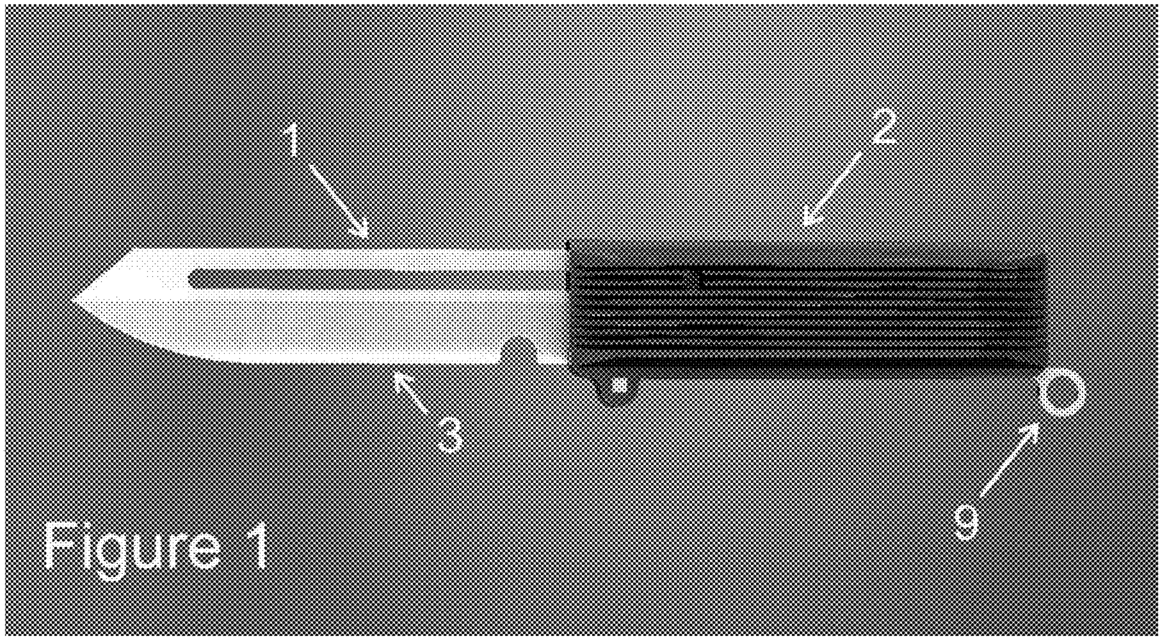
FIG. 1 is a front elevation view of a fixed-blade knife with a combined handle and sheath in a knife useable position.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various illustrative embodiments may be useful for more than just eliminating structural weaknesses associated with a folding knife, or reducing weight and cost of a fixed blade knife and sheath. Various illustrative embodiments may serve as a locking mechanism to protect children from accidentally cutting themselves. Other various embodiments protect the cutting edge of a knife in a toolbox, tackle box, picnic basket, or other container where a sheath would be bulky and inconvenient. These and other aspects of this design will be discussed further below.

FIG. 1 illustrates an example of an improved fixed-blade knife. A blade metal portion (1) encompasses the blade and extends into a slot in a handle/sheath (2). A sharp portion of the blade (3), in this example, is depicted on a single edge only, but need not be limited to a single edge. In accordance with various embodiments, a finger-actuated spring clip (9) is shown here, the purpose for which is explained below.

Materials (including heat treatment) used for this preferred embodiment are common for other knives, folding or fixed blade, currently found on the market. A large number of stainless or non-stainless steels/steel alloys are available for the blade metal and tang portion (1). Such steels are chosen for various features of the steel, considered in combination, including toughness, hardness, ability to hold an edge, resistance to corrosion, sharpen-ability, formability, cost, and other factors. One example of a very high quality blade steel, which excels in many of the material property criteria listed above, is called "S30V"—a proprietary knife steel created by a Crucible Industries, a company that specializes in a powder metallurgy forging process. A more commonly found, functional, and lower cost knife steel is the stainless steel alloy "8Cr13MoV", which is reasonably tough, corrosion resistant, but does not hold an edge as well as some other alloys. Examples of handle materials that could be used for the assembly shown in FIG. 1 include, but are not limited to dozens of thermoplastic polymers and thermoplastic elastomers, various synthetic laminates, metals such as various alloys of stainless steel, aluminum alloy, and titanium, and natural materials such as wood, bone, leather, etc. Given the relatively complex and intricate nature of the handle example shown in FIG. 1, a molded thermoplastic material, or perhaps an aluminum extrusion with some post-extrusion milling, may be used when considering marketability, durability, material selection, etc.

Figure 2:
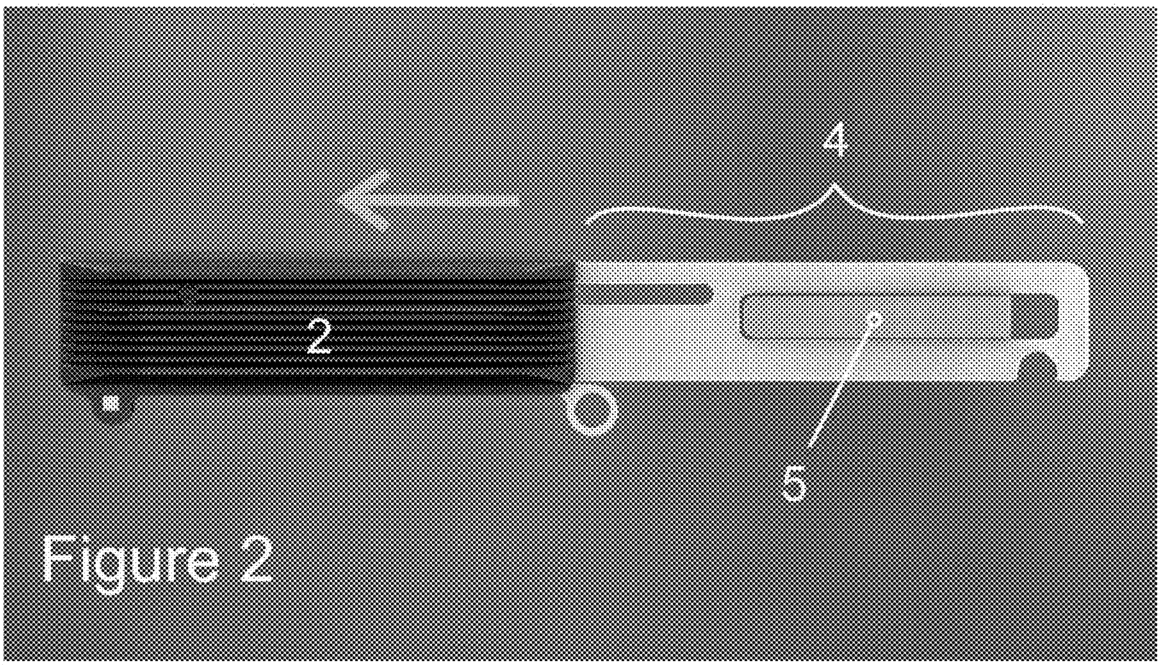
FIG. 2 is a front elevation view of the knife of FIG. 1 with a combined handle and sheath in a knife storage position.

FIG. 2 depicts the knife shown in FIG. 1 where the handle/sheath (2) has been slid in the direction of the arrow to cover the blade, and now serves as a sheath. A tang (4), which is a single piece with the blade portion (1) in FIG. 1, is exposed. In this embodiment, a pocket clip (5), incorporated into the handle portion, is also exposed by sliding the handle/sheath in the blade direction. The pocket clip (5) may be used to hang or clip the knife assembly to a belt or pocket, for example.

Figure 3:
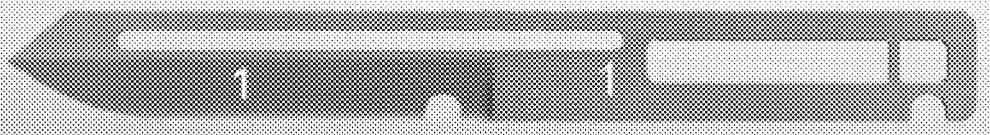
FIG. 3 is a plan view of the knife blade and tang of the knife of FIG. 1.

FIG. 3 depicts the metal portion (1) of the version of FIG. 1, with the handle/sheath and other components removed. As can be seen, the metal portion (1) is formed as a single component—blade and tang.

Figure 4A:
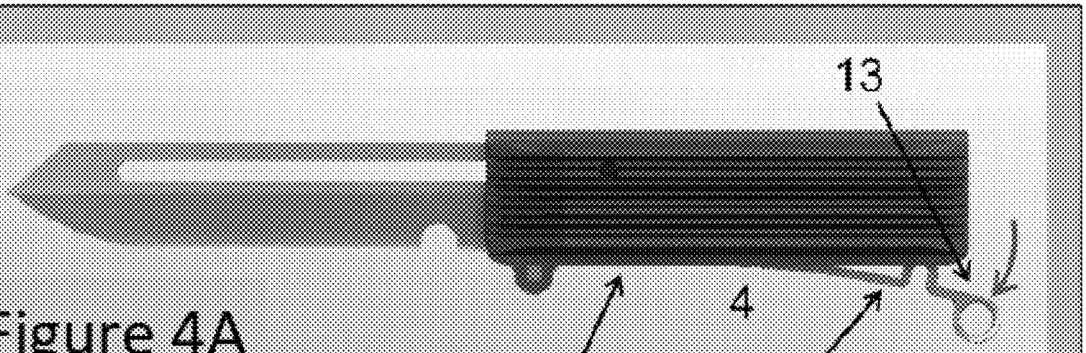
FIG. 4A is a front elevation view of the knife of FIG. 1 wherein a spring clip is moved away from the sheath.
Figure 4B:
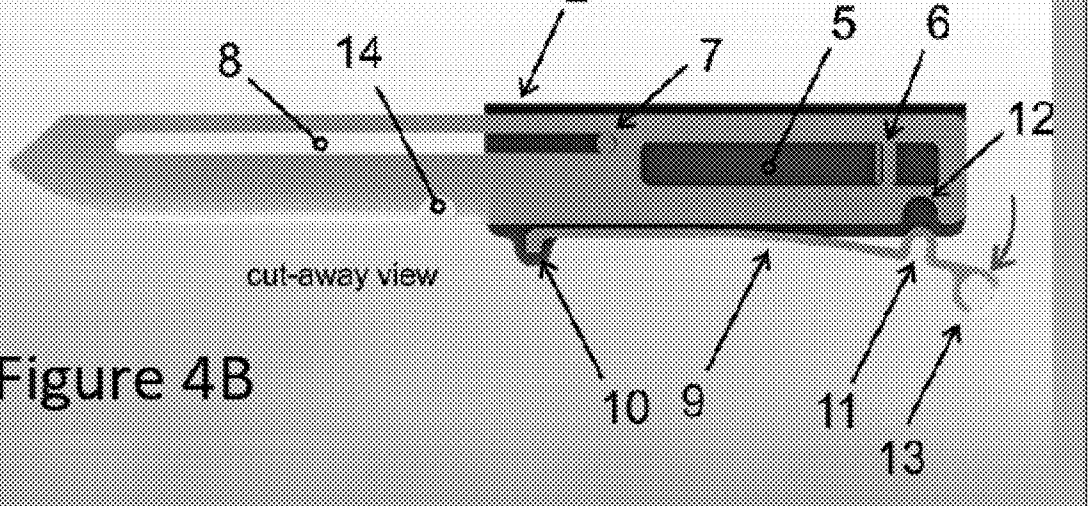
FIG. 4B is a front elevation view showing the knife of FIG. 1, wherein a portion of the sheath has been removed for clarity.

Referring now to FIG. 4, the opening, closing, and locking mechanism for various embodiments, is depicted. The top frame in FIG. 4 shows an illustrative embodiment of the fixed-bladed knife with handle/sheath (2), in side view. The lower frame of FIG. 4 depicts the same version of the knife in a cut-away view. The knife is here shown with handle/sheath (2) in "handle" mode, where handle/sheath (2) is in the handle position. A spring clip (9), which is affixed to the handle at one handle protrusion point (10), has been pulled down by a user (in the direction indicated by the arrows), in preparation for "closing" the handle/sheath over the blade. Pulling the spring clip (9) down disengages the spring clip protrusion (11) from a mating notch in the tang (12). This disengagement permits the handle/sheath to slide toward, and eventually cover, the blade. In the closing process, the spring clip protrusion (11) reaches the mating notch in the blade (14), and removeably locks the handle/sheath in place over the blade, as seen in FIG. 2.

A pin (7) which permanently affixes the handle/sheath to the blade/tang, rides in a blade slot (8), stabilizing the handle/sheath to the blade/tang, and preventing the handle/sheath from moving too far in either direction on the blade/tang (1). When manufacturing the knife assembly, the pin may be press-fit, screwed (threaded pin needed in this case), or otherwise attached to the handle via a pre-drilled or pre-molded hole in the handle, and through the slot in the blade. A finger grip (13) permits convenient actuation of the spring clip (9) with one hand. As mentioned previously, moving the handle/sheath (2) forward over the blade (1) exposes a pocket clip (5), which is removeably attached to the tang (4) via a cross bar (6).

Figure 5:
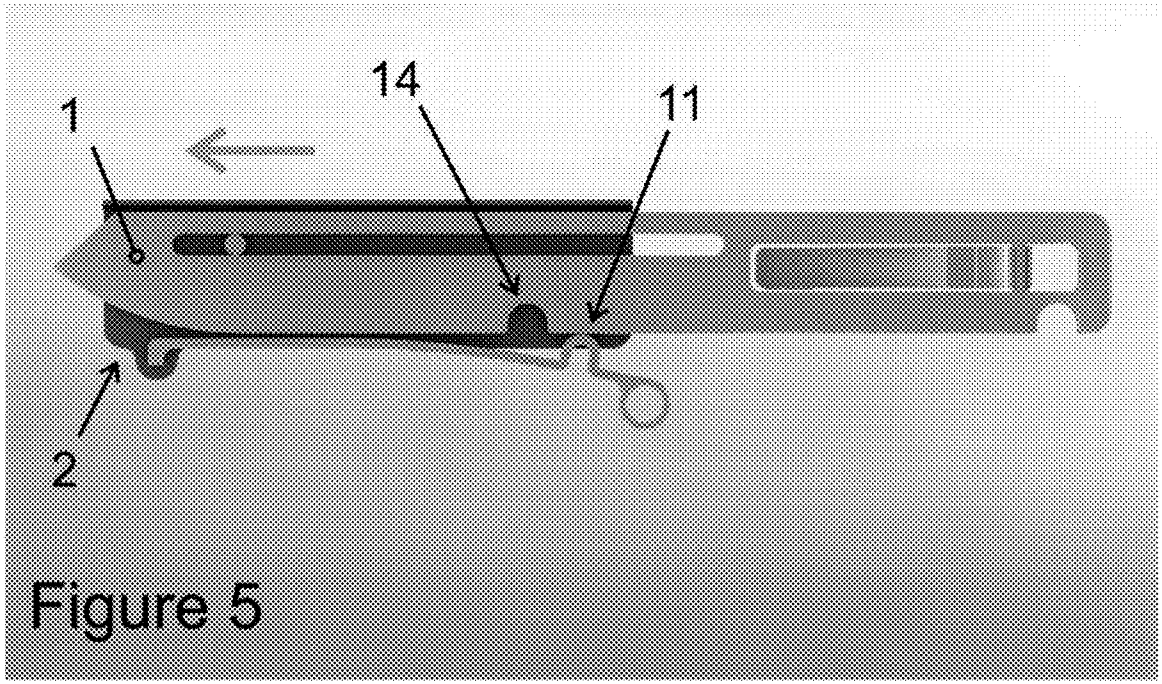
FIG. 5 is a front elevation view showing the knife of FIG. 1, wherein the sheath has been moved relative to the tang.

In FIG. 5, the user continues the process of closing the handle/sheath (2) over the blade (1). The handle/sheath is slid in the direction of the arrow. The spring clip (11) is almost to the point of popping into the blade notch (14), which will discourage further advance of the handle (2) over the blade (1).

Figure 6A:
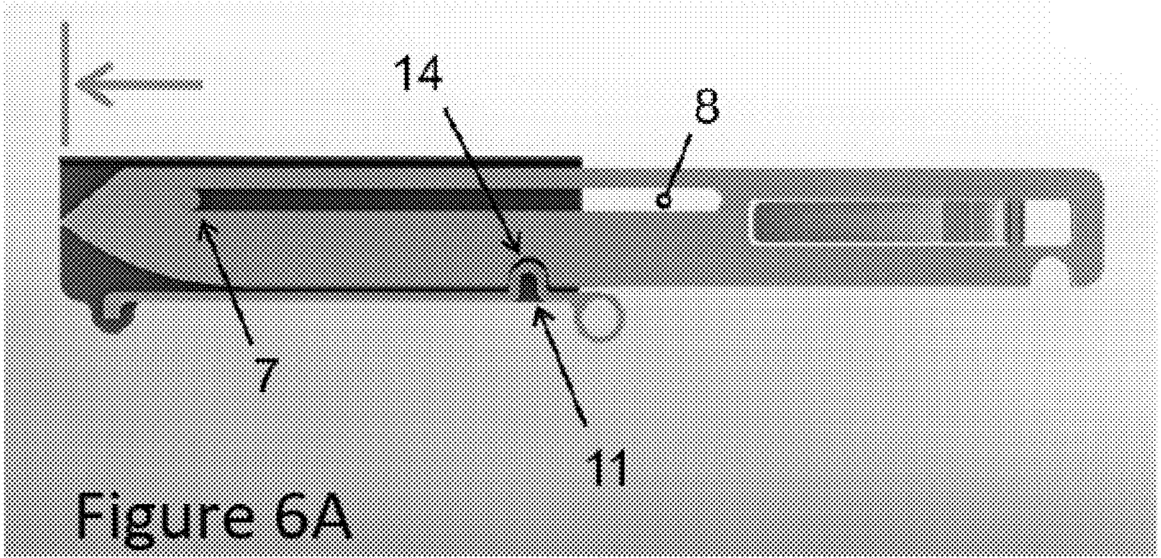
FIG. 6A is a front elevation view similar to FIG. 5, wherein the sheath has been moved and locked fixed to a second portion of the tang.
Figure 6B:
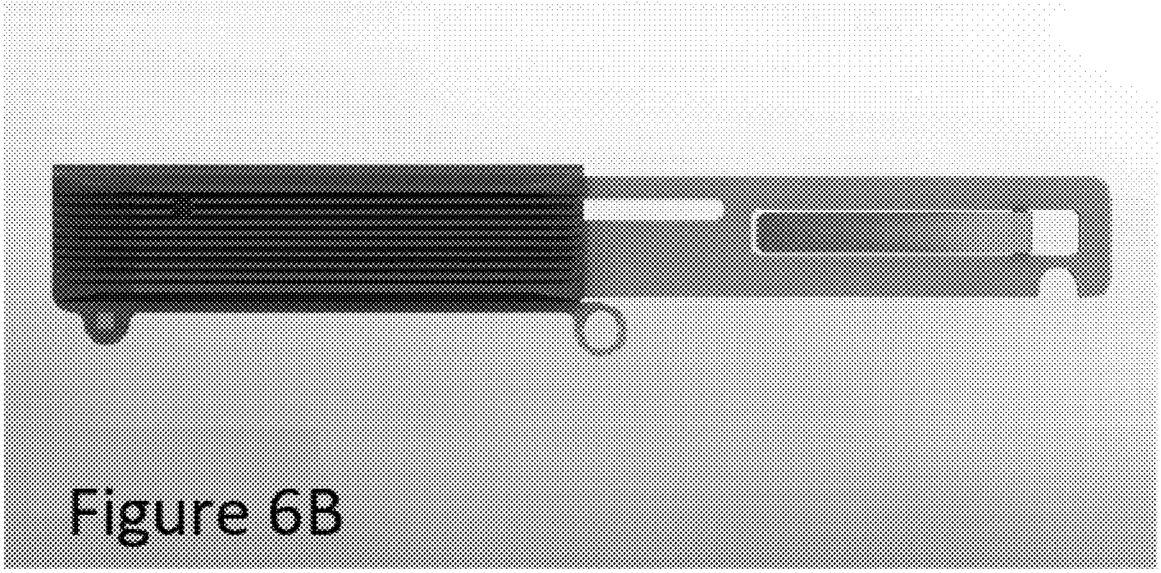
FIG. 6B is a front elevation view similar to FIG. 6A, wherein the entirety of the sheath is shown.

FIG. 6 depicts the continued closing of the handle over the blade shown in FIGS. 4 and 5. The handle (2) has now closed over the blade, and now functions as a sheath (2). The spring clip (11) has popped into the blade notch (14). The pin (7) has reached the end of its travel in the blade slot (8). The process of removing the knife from a belt or pocket, opening the knife, closing the knife, and returning it to a belt or pocket may be performed quickly, and using one hand.

Figure 7:
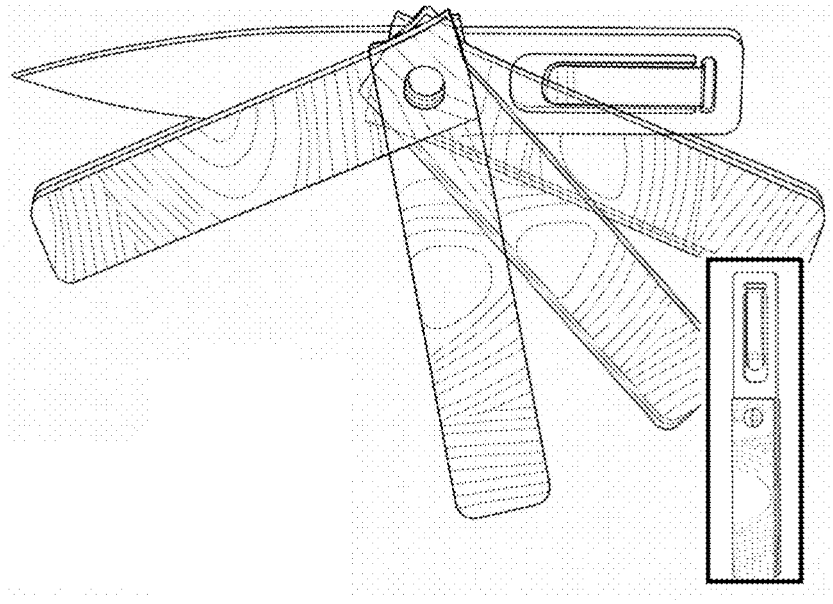
FIG. 7 is an illustrative embodiment of a knife with a rotatable handle and sheath.

FIG. 7 depicts an alternative knife design, using a pivoting, rather than sliding handle/sheath, to achieve the goal of creating a fixed-blade knife wherein the handle becomes the sheath. In this case, the handle/sheath portion need not be slotted, but may be composed of two separate pieces. Or, the handle/sheath portion may be only partially slotted.

Figure 8:
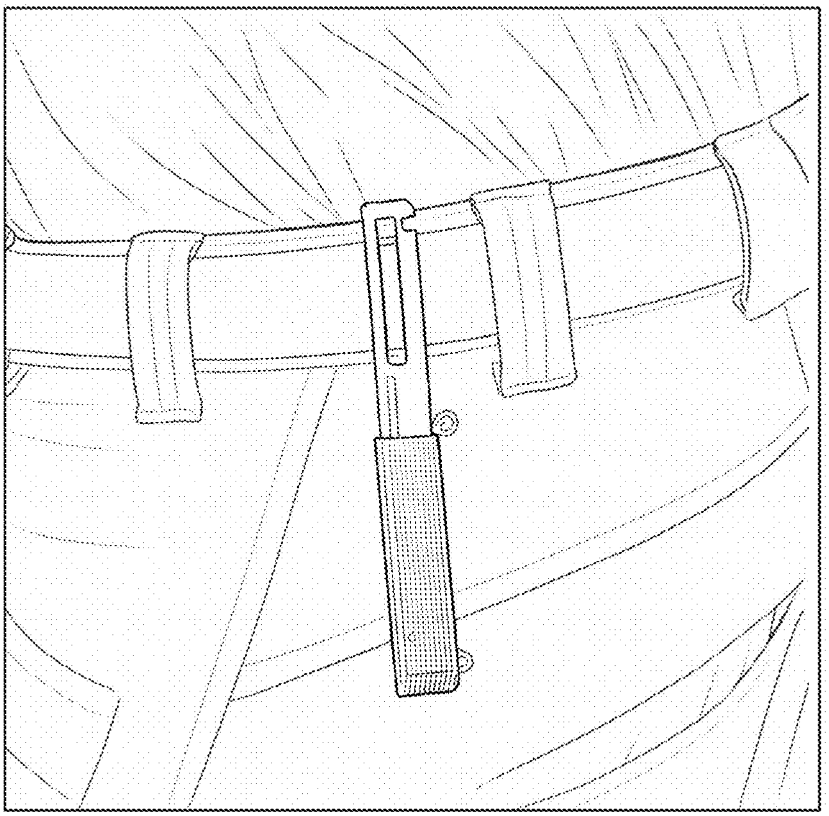
FIG. 8 is a depiction of a knife similar to the knife of FIG. 1 clipped to a belt in a knife storage position.
Figure 9A:
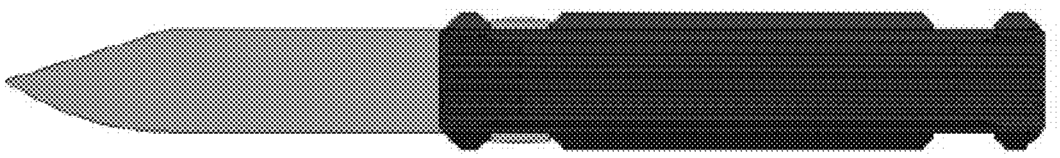
FIG. 9A is a depiction of an alternative embodiment of a knife in a first position of use with a slidable sheath and an alternative locking arrangement.
Figure 9B:
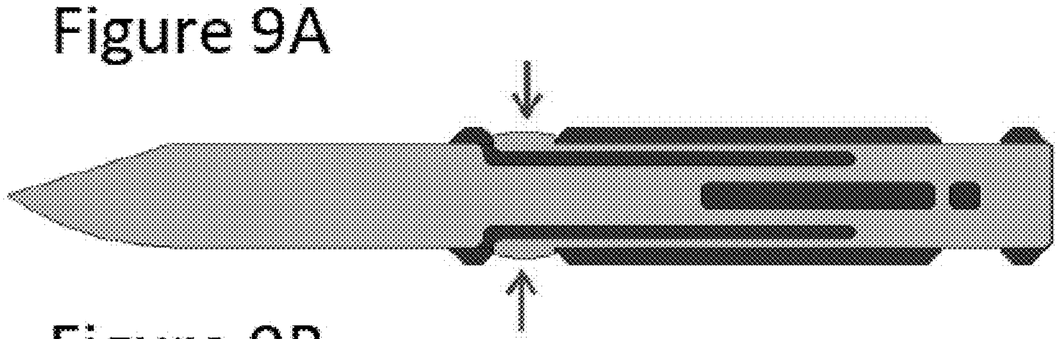
FIG. 9B is a depiction of the embodiment shown in FIG. 9A, wherein a portion of the sheath has been removed for clarity.
Figure 9C:
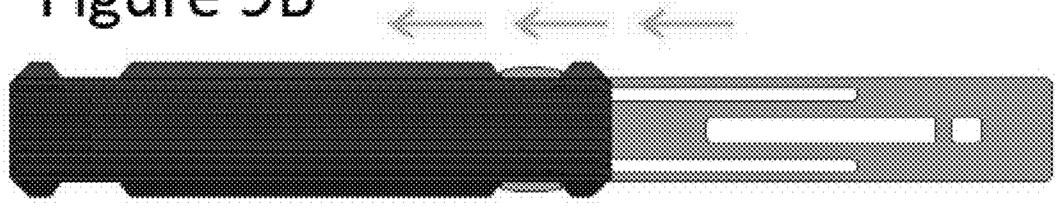
FIG. 9C is a depiction of the embodiment shown in FIG. 9A in a second position of use with a slidable sheath and an alternative locking arrangement.
Figure 9D:
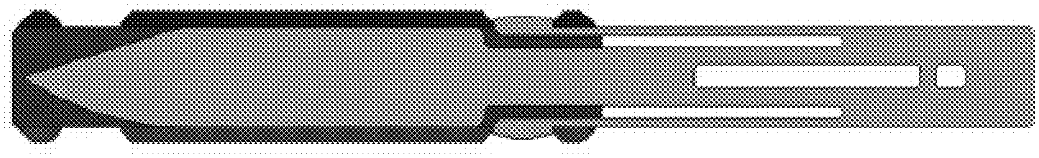
FIG. 9D is a depiction of the embodiment shown in FIG. 9C, wherein a portion of the sheath has been removed for clarity.

FIG. 8 depicts an illustrative embodiment of the fixed-blade knife in "sheath" mode, clipped to a user's belt. Note that the sharp blade is well-enclosed, and the user well-shielded. This picture is included to show one possible size of many possible sizes. The everyday fixed blade knife with handle/sheath could be made much smaller than the one shown in FIG. 8 or alternatively larger than the one shown.

In the following illustrations, various mechanisms for holding and/or locking a blade in position relative to a combination handle/sheath are shown and described.

FIG. 9 illustrates a knife blade (light color) and handle/sheath combination (dark color). Together, a blade, handle (and other associated parts) in this and following illustrations will be known as a "knife". The handle/sheath portion of this and similar concept models described below typically feature a slot through the center of the handle/sheath, into which the blade/tang may be inserted when the knife is in use, or from which the blade/tang may, in some cases, be easily removed for servicing (cleaning, sharpening, polishing, lubrication, etc.).

Frame A in FIG. 9 is a side view of the knife with handle drawn back to expose the blade. Frame B is a cut-away view revealing the single piece blade/tang. Two buttons on the top and bottom edge of the tang protrude through the top and bottom surface of the handle. The size and shape of the buttons and the openings on the top and bottom of the handle are designed to fit together snugly and securely, preventing the handle from moving forward or backward relative to the blade and tang. When those two buttons are simultaneously pressed sufficiently (in the direction of the dark-colored arrows shown if Frame B), the handle is released relative to the blade/tang, and may be slid up to cover the blade (in the direction of the lighter-colored arrows in Frame C). When the tang buttons reach the second set of openings on the top and bottom edge of the handle, the buttons pop out into those openings, preventing the handle from moving further. In this position, the handle covers and sheaths the blade. Frame D in FIG. 9 is a cut-away view of the knife shown in Frame C, showing the buttons popped out, with the blade sheathed by the handle.

This knife design is composed of just 2 parts. The fact that 2 buttons must be depressed to release the blade from the handle reduces the chance of accidental release. This design also allows the blade/tang to be quickly separated from the handle/sheath for cleaning and/or sharpening. The tang might incorporate a pocket clip, bottle opener, a wrench, or other device or devices to add value, convenience, and/or utility to the knife.

Figure 10A:
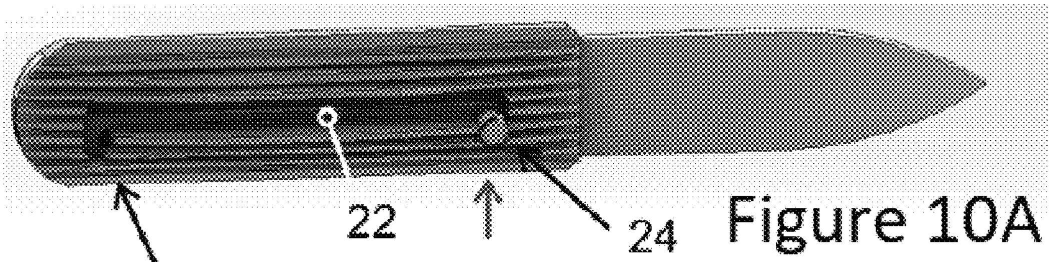
FIG. 10A is a depiction of another illustrative embodiment of a knife with a slidable handle/sheath, wherein the tang is in a first position of use.
Figure 10B:
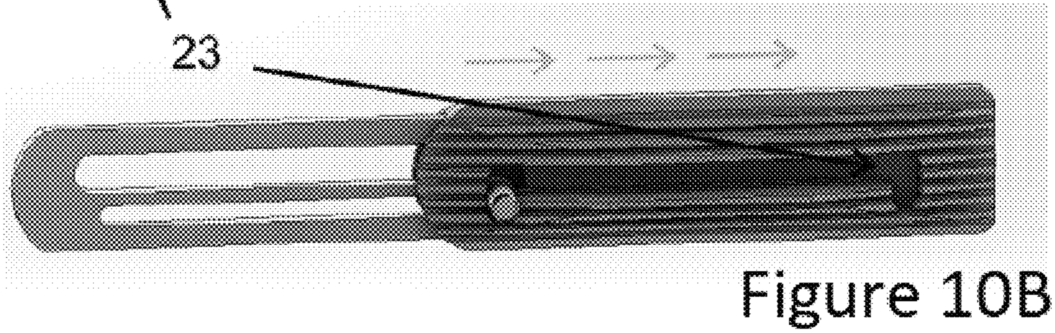
FIG. 10B is a depiction of the embodiment shown in FIG. 10A, wherein the tang is in a second position of use.
Figure 10C:
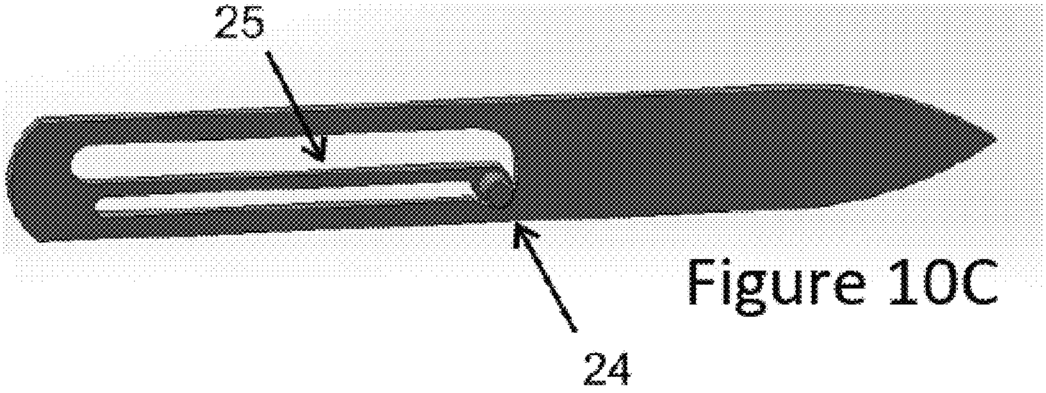
FIG. 10C is a depiction of the tang employed in the embodiment shown in FIG. 10A.

FIG. 10 illustrates a knife similar to those shown in FIGS. 1 and 9, with blade and tang extending the length of the knife, and a slotted handle that may slide along the blade tang to function as a handle or sheath. A slot (22) on one side of the handle/sheath is bounded front and back by cuts (23) designed to snugly and securely hold the blade/tang protrusion (24). Frame A shows the knife with blade exposed, with protrusion (24) snugly and securely seated in forward cut (23). This holds the blade by the spring action of a portion of the tang (25) (shown in Frame C), and prevents handle movement relative to the blade. When the protrusion (24) is lifted out of the forward cut, the handle may now slide over the blade (in the direction of the arrows shown in Frame B) until the blade is fully covered and the protrusion (24) pops down into rear cut (23) of the handle, and the handle now functions as a sheath. Frame C shows the blade/tang without the handle sheath, to allow a view of the spring portion of the tang (25). This knife design requires removal of protrusion (24) for disassembly. The blade may be sheathed and/or exposed with the use of one hand.

Figure 11A:
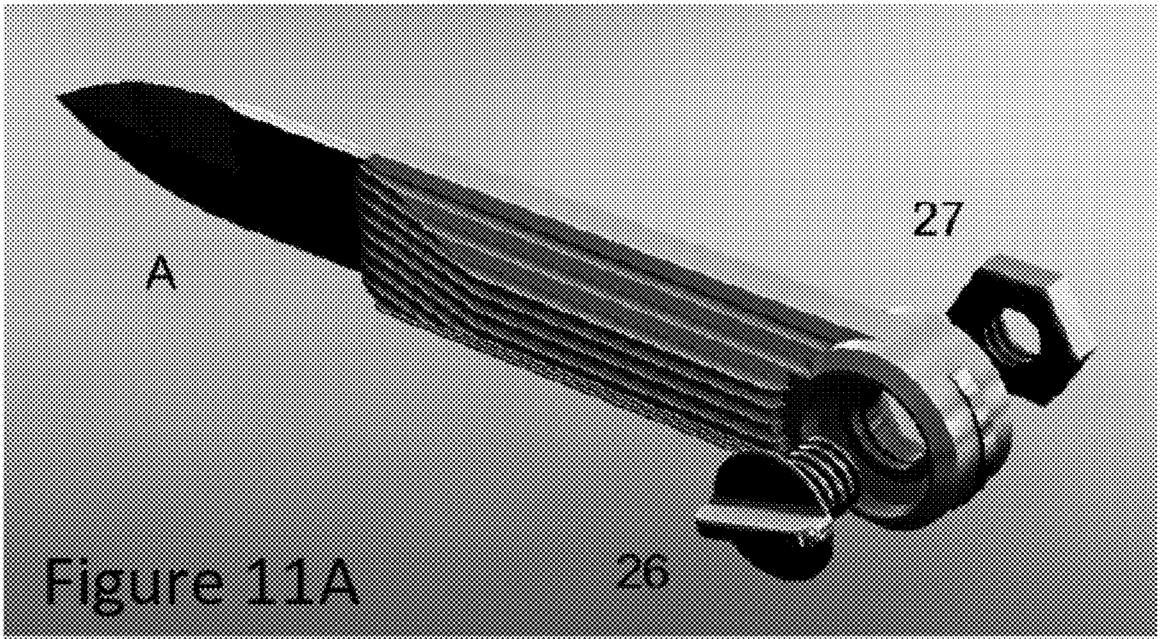
FIG. 11A is a depiction of another illustrative embodiment of a knife with a slidable handle/sheath.
Figure 11B:
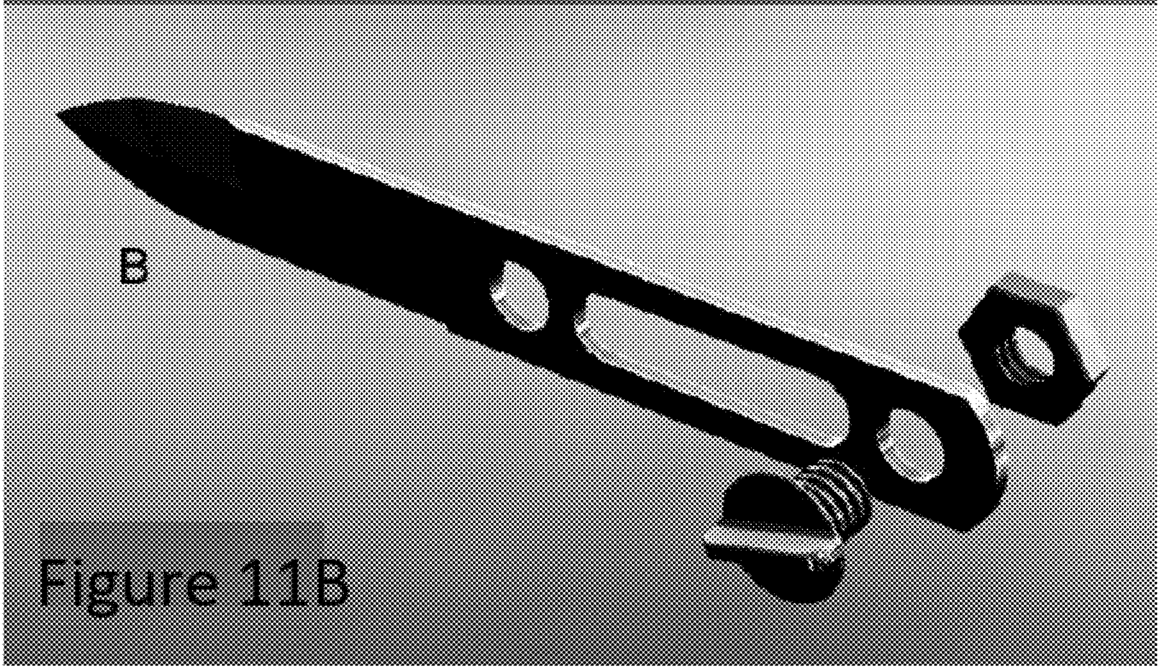
FIG. 11B is a depiction of the knife shown in FIG. 11A, wherein the sheath has been removed for clarity.

FIG. 11 again shows a knife with blade and tang extending the length of the knife, and a slotted handle that may slide along the blade tang to function as a handle or sheath. Frame A in FIG. 11 shows the blade and handle, along with a thumb bolt (26) and nut (27) designed to be gripped and tightened or loosened by the user using only his or her hand. The thumb bolt passes through the knife handle/sheath and through holes in the blade/tang. When the thumb bolt is inserted through the handle and tang and hand-tightened, the handle/sheath is held securely in position relative to the blade/tang. The rear hole in the tang (hole furthest from the blade) positions the handle/sheath in the "handle" position, where the blade is exposed. When the thumb bolt is removed and the blade slid back into the knife handle, the handle becomes the knife sheath. The forward hole (hole closest to the blade) of the blade/tang is aligned with the handle/sheath hole, the thumb bolt is re-inserted through the handle/sheath and blade/tang, threaded into the nut, and the assembly is tightened. Now, the blade is securely shielded by the sheath.

The knife design shown in FIG. 11 requires removal and re-installation of the thumb bolt to convert the knife handle into the sheath function and, conversely, the sheath into the knife handle. The advantage of this design is that it is simple to understand, is made up of only four parts (as opposed to usually 15 to 25 parts for a typical modern folding pocket knife), and is robust in its application.

FIGS. 12, 13, 14, and 15 (below) illustrate a fixed-blade knife similar to that shown in FIG. 10, with blade, "full tang" (tang extending essentially the complete length of the handle), and a slotted handle that may slide along the blade/tang to function as a handle or sheath.

Distinguishing this design from previous designs shown above are several innovative features:

This particular knife is designed to serve as an EDC (everyday carry)—type pocket knife. It is small enough to fit into a front pocket, and is designed to be opened and closed with one hand.

The blade/tang (27) has an extension which is designed to serve as a pocket hook.

The function of the thumb bolt (26)/nut (27) described for FIG. 11 has been replaced with a lever bolt/nut combination that need not be removed from the knife assembly to release the blade and allow the blade to slide back and forth relative to the handle/sheath. This will be described in more detail below.

The various features described here need not be limited to the knife designs shown in this disclosure, but could be applied to knives with culinary or other functions, to portable saws, and to other tools. For example, the "extended tang which is bent to serve as a hook" feature is a sturdy alternative to pocket knife "clip" typically attached to a pocket knife handle with screws which sometimes loosen and fall out. The extended tang would be useful to hold a larger, tactical blade on a backpack strap, or to allow a pruning saw to be hung in a branch.

Figure 12A:
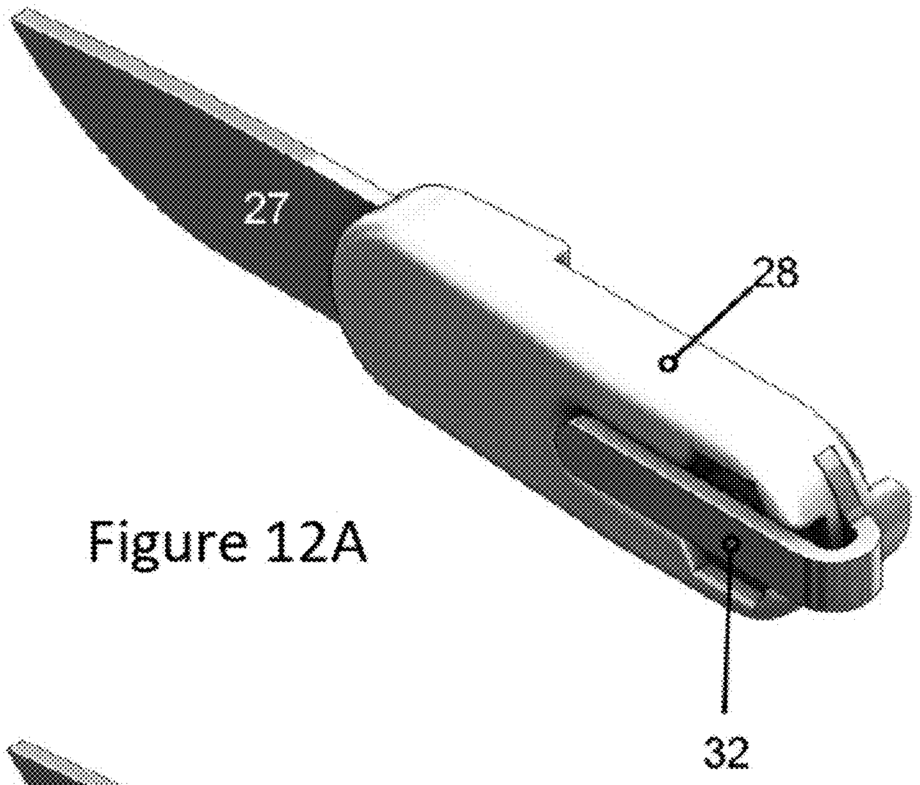
FIG. 12A is a rear perspective view of a knife of another embodiment of the present invention.
Figure 12B:
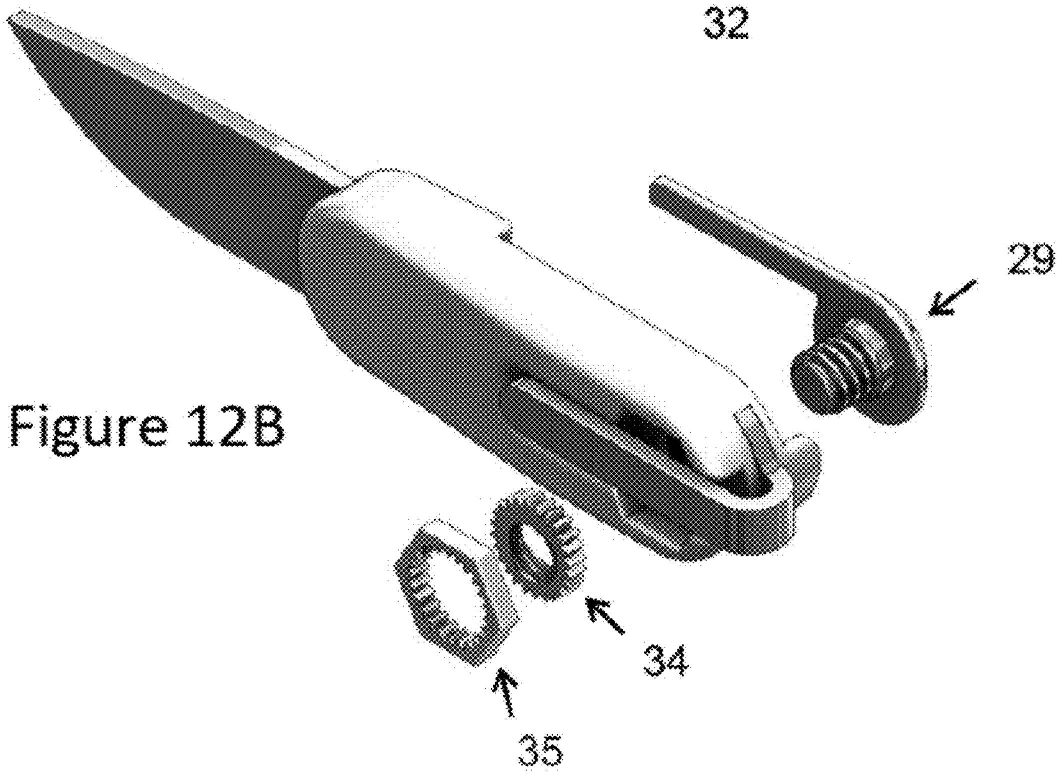
FIG. 12B is a partially exploded version of FIG. 12A.
Figure 13A:
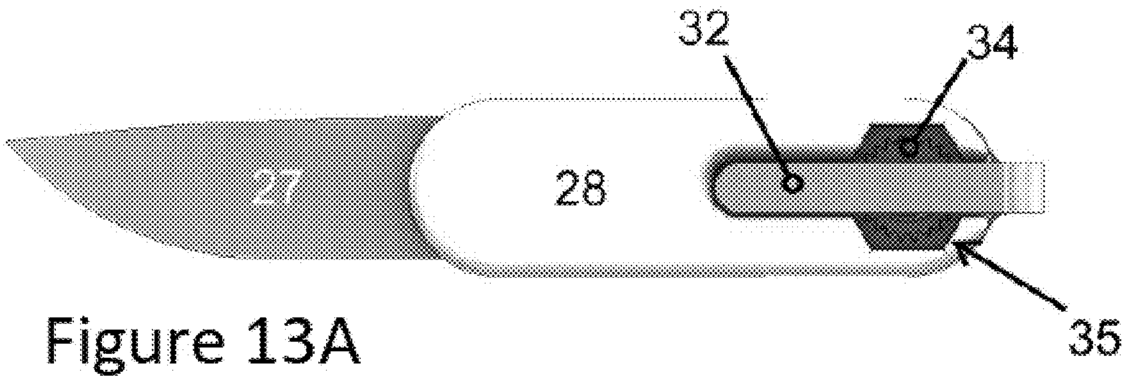
FIG. 13A is a front elevation view of the knife shown in FIG. 13A.
Figure 13B:
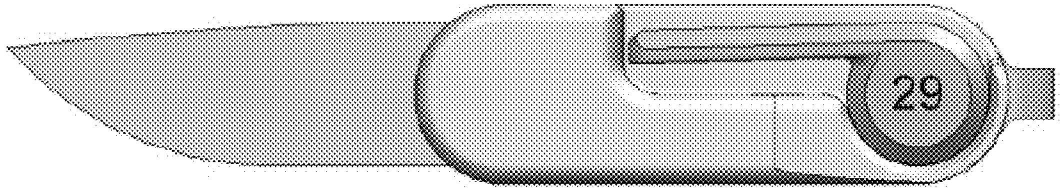
FIG. 13B the rear elevation view of the knife shown in FIG. 13A
Figure 13C:
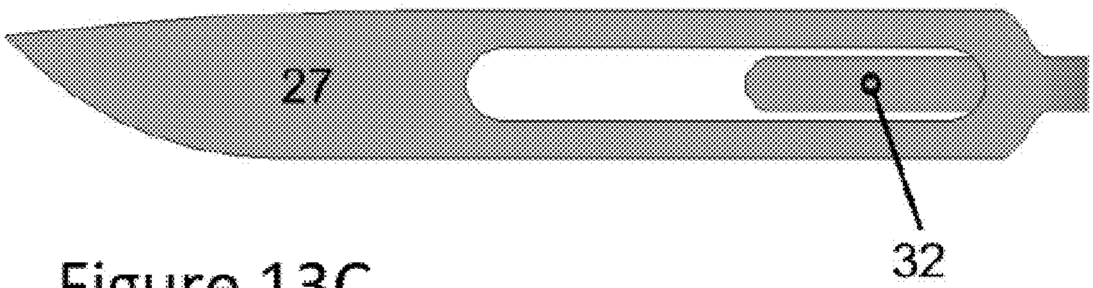
FIG. 13C is a tang with the interconnected clip employed by the embodiment shown in FIG. 13A.
Figure 13D:
FIG. 13D is a top plan view of FIG. 13C.
Figure 14A:
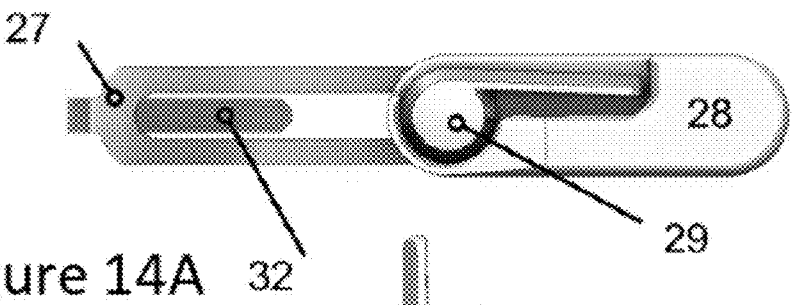
FIG. 14A is a front elevation view showing the knife of FIG. 13A and a second position of use wherein the point of the tang is concealed within the sheath.
Figure 14B:
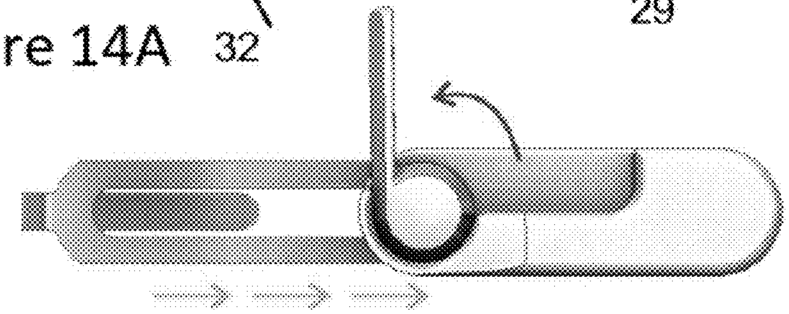
FIG. 14B is a front elevation view of the knife shown in FIG. 14A, wherein a lever is rotated to allow the tang to move relative to the sheath.
Figure 14C:
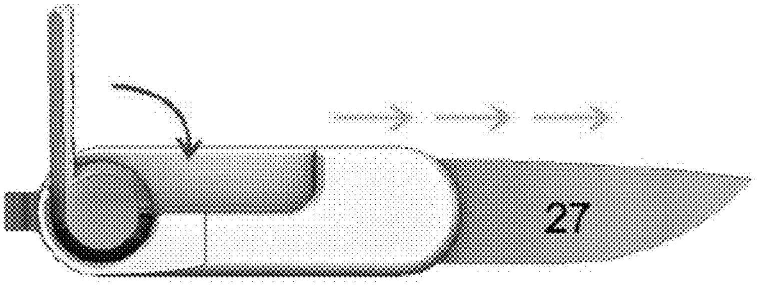
FIG. 14C is a front elevation view of the knife shown in FIG. 14A, wherein the blade has been moved to a second position of use.
Figure 14D:
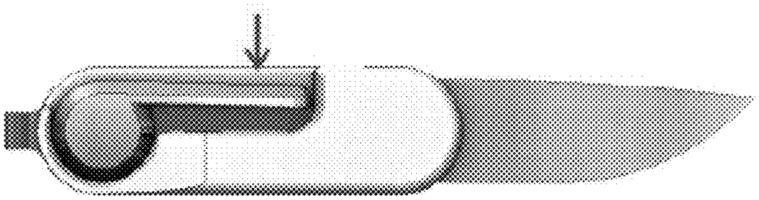
FIG. 14D is a front elevation view of the knife shown in FIG. 14A, wherein the lever is rotated into a position that prevents the tang for movement relative to the sheath.

In more detail, FIG. 12 shows one version of a "lever lock" fixed-blade pocket knife with a full-tang blade (27) and slotted handle (28), an extension to the tang 32, a lever bolt (29), an adjusting nut (34), and a lock nut (35). Frame A in FIG. 12 shows the knife assembled, with blade exposed. Frame B shows a partially exploded view of the knife in Frame A to identify the lever bolt, adjusting nut, and lock nut.

FIG. 13 shows the same knife as that illustrated in FIG. 12. Frame A in FIG. 13 shows a left-side view of the assembled knife with blade exposed. Frame B shows a right-side view of the assembled knife with lever bolt (29) identified. Frames C and D show the blade/tang alone, with tang extension (32) identified.

FIG. 14 illustrates the "lever lock" function of the knife design illustrated in FIGS. 12 and 13. Frame A in FIG. 14 is a right-side view of the assembled knife with blade sheathed. Lever bolt (29) is in "locked" position. In Frame B, the lever bolt has been rotated approximately 90 degrees upward (direction of darker-colored arrow), which unlocks the blade/tang, allowing the blade/tang to slide forward (direction of lighter-colored arrows) relative to the handle, thereby exposing the blade. In Frame C of FIG. 14, the blade is fully extended, but the lever bolt remains in the "unlocked" position. In Frame D, the lever bolt has been returned to the locked position, securing the exposed blade in place.

Figure 15A:
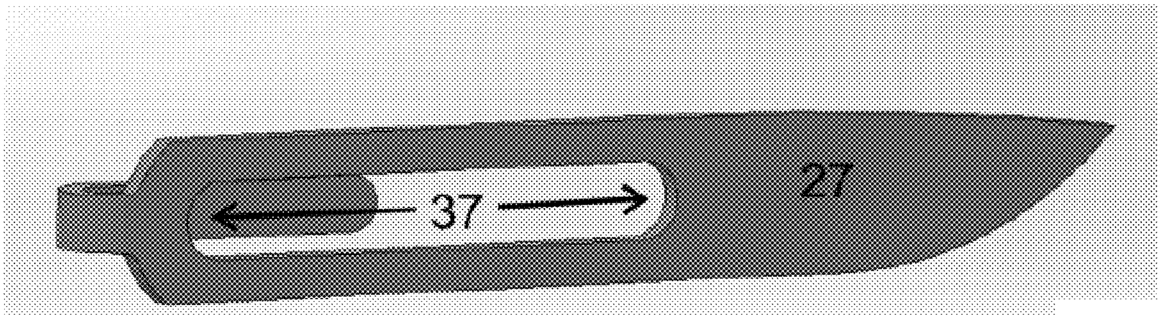
FIG. 15A is a perspective view of the tang employed in the embodiment shown in FIG. 14A.
Figure 15B:
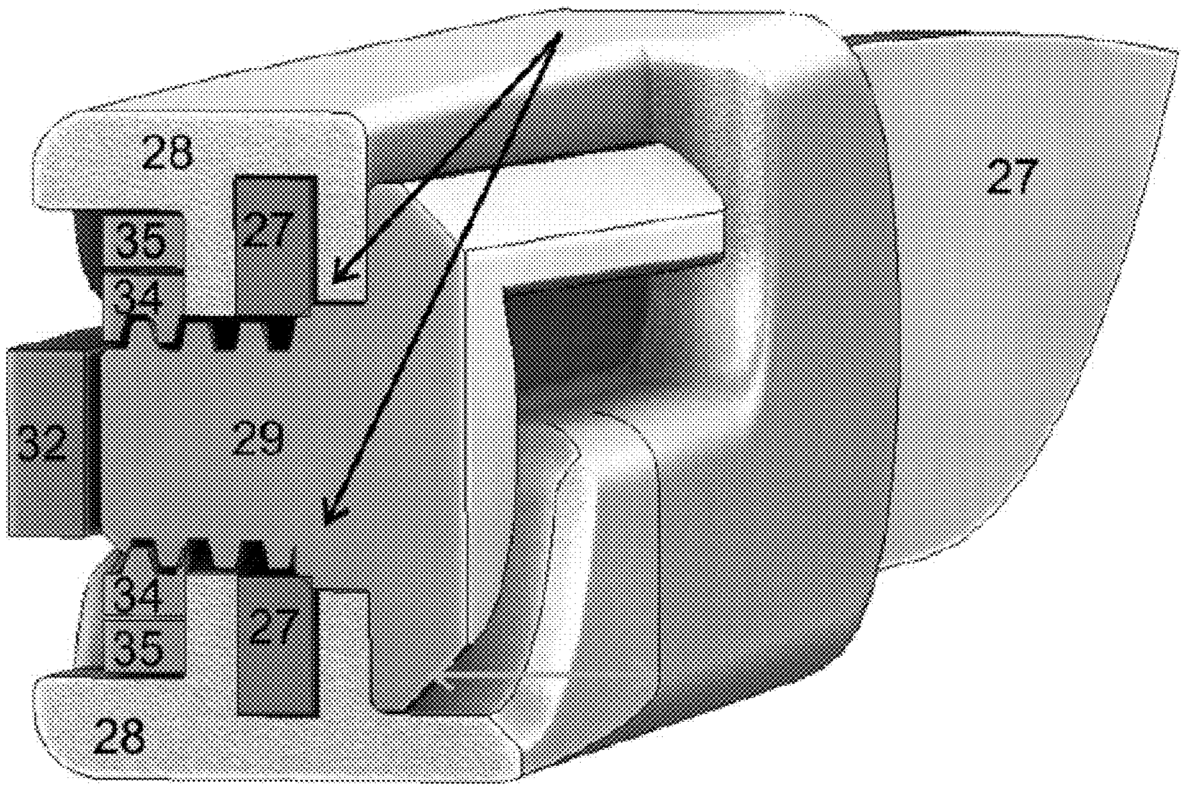
FIG. 15B is a cross-section of the knife shown in FIG. 14A.

FIG. 15 shows the details of the "lever lock" function of the knife described in FIGS. 12, 13, and 14. Frame A in FIG. 15 shows the naked blade/tang, and identifies the blade/tang slot (37) which controls the range of back and forth movement of the blade/tang relative to the handle (29, shown in Frame B). Frame B illustrates a cutaway view of the knife, exposing the various components. In Frame B of FIG. 15, the lever bolt (29) is in "locked" position—note the horizontal aspect of the lever of the bolt relative to the knife handle (28). The lever bolt is threaded through/engaged with adjusting nut (34). Lock nut (35) prevents adjusting nut (34) from rotating when lever bolt (29) rotates. This occurs because the lock nut has an exterior hex shape (FIG. 12, Frame B) which nests into the knife handle (28) when assembled, preventing rotation of the lock nut. Additionally, the lock nut has a toothed interior, which engages with the toothed exterior of the adjusting nut (34) (FIG. 12, Frame B). The combination of nesting hex and toothed engagement prevents rotation of both adjusting nut and lock nut when the lever bolt is rotated.

The toothed engagement of the adjusting nut (34) and the lock nut (35) allows for fine adjustment of the tightness of the lever bolt (29) relative to the blade/tang (27) and the blade/tang slot (37) (shown in FIG. 15, Frame A). Once the fine adjustment of the adjusting nut (34) is made, the lock nut (35) is inserted over the adjusting nut to lock it in place. Thereafter, a one-quarter turn (right hand thread, in this design) of the lever bolt squeezes the chamfer of the lever bolt against the blade/tang slot (39), and also squeezes the blade/tang against the interior slot of the knife handle, thereby preventing movement of the blade relative to the handle. Thread pitch must be steep enough to allow the lever bolt to disengage the blade/tang with, in this design, one-quarter turn in the counterclockwise (facing lever bolt head) direction. For this prototype, I used a 0.083 pitch thread. Any lever bolt, adjusting nut, and/or lock nut thread could be used if the necessary meshing and disengagement requirements are met.

Advantages of the design depicted in FIGS. 12, 13, 14, and 15:

- This is a fixed-blade knife, avoiding the inherent weaknesses of a jointed blade as discussed above.
- This knife is sized to fit in a pocket, not worn on a belt, and does not need a separate sheath to protect the blade or the user.
- The blade may be released and locked quickly, with one-quarter turn of a lever. With a little practice, it may be accessed, opened, and closed using one hand.
- This design features a pocket hanger that is one piece with the tang, and which, therefore is less prone to loosening than pocket clips that are screwed to a knife scale/housing.

This design is composed of 5 parts, compared to between about 15-25 or more parts for a modern folding knife.

This knife may be completely disassembled without tools, for cleaning or other service, if necessary.

Figure 16A:
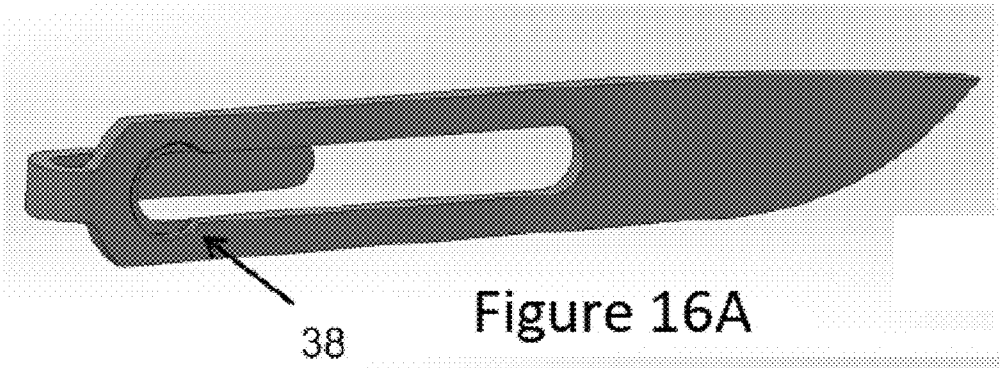
FIG. 16A is a perspective view of an alternative tang that may be employed in the embodiment shown in FIG. 14A.
Figure 16B:
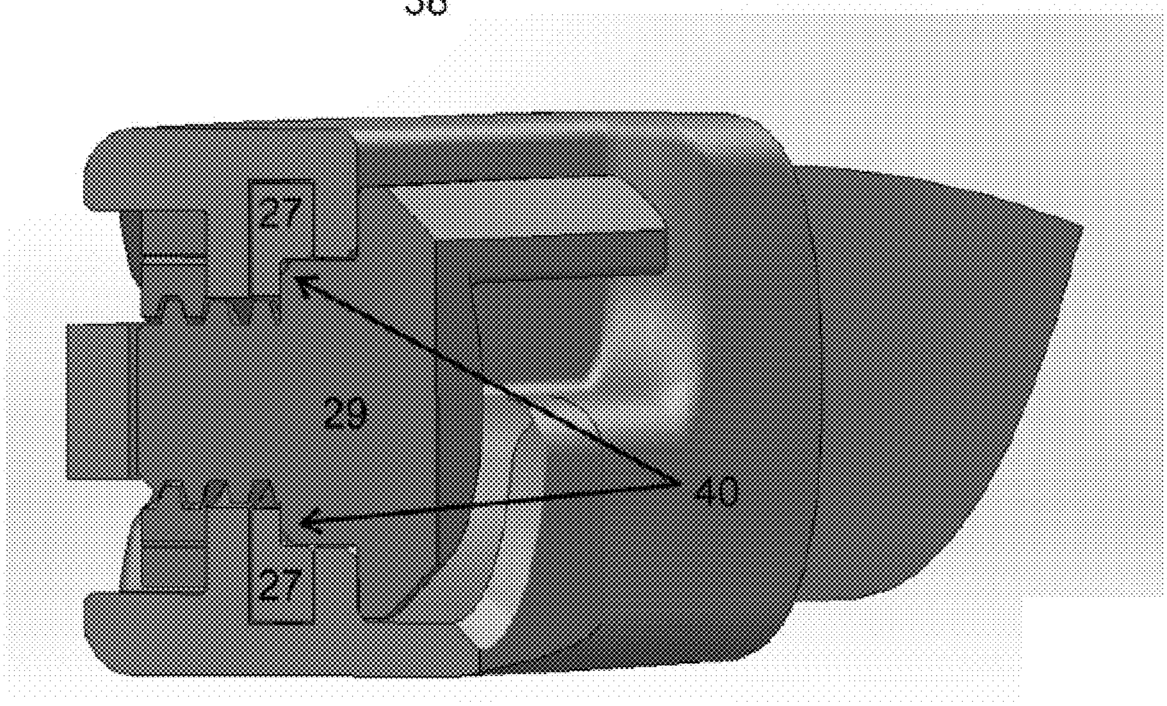
FIG. 16B is a cross-section of the knife shown in FIG. 16A.

FIG. 16 illustrates a variation of the knife design described in FIGS. 12 through 15. That knife design relies upon friction between the chamfer of the lever bolt against the blade/tang slot (39 in FIG. 15), and friction between the blade/tang against the interior slot of the knife handle to prevent movement of the blade relative to the handle. Without significant testing, it is difficult to know if that friction is sufficient to prevent movement of the blade relative to the handle under load. For example, if a user were to hammer, with blade exposed, on the handle of the knife described in FIG. 12-15 while somehow avoiding the extended tang (32 in FIG. 13), it is possible the blade might be forced back up into the handle. There is no "hard stop" provided in that version of the knife design. The modification described in FIG. 16 provides such a stop when the lever bolt is locked with the blade exposed.

As described earlier, slot (37, FIG. 15, Frame A) defines the range of movement of the blade/tang relative to the handle/sheath of the knife design featured in FIGS. 12-15, and now including FIG. 16. When the blade is moved relative to the handle (or the handle moved relative to the blade) in the assembled knife, the threads of the lever bolt (29 in FIG. 12, Frame B) prevent further movement, with the blade either fully retracted or full extended. At either point—blade retracted or extended—the lever bolt may be locked (Frames C and D in FIG. 14).

The design variation shown in FIG. 16 features two modifications. The blade/tang in FIG. 16 has been provided a counterbore (38) which is concentric with the rear radius of the slot (37, FIG. 15, Frame A). The rear radius corresponds to the "blade exposed" position.

The lever bolt (29, FIG. 16) has been modified such that, when in "lock" position, a portion nests into the blade/tang counterbore (38, FIG. 16, Frame A). This provides a "hard stop" when the blade is in the extended position. If desired, such a counterbore (or countersink, or other indentation) could be provided on the front ("knife retracted") part of the slot, as well. The overall locking mechanism design described in FIGS. 12 through 16 could be implemented in a wide variety of applications/product (knife, saw, tool) designs where the Fixed-Blade Knife with Combined Handle/Sheath concept could be used to advantage. The specific "pocket knife" size and application shown above are not meant to limit its scope.

Figure 17A:
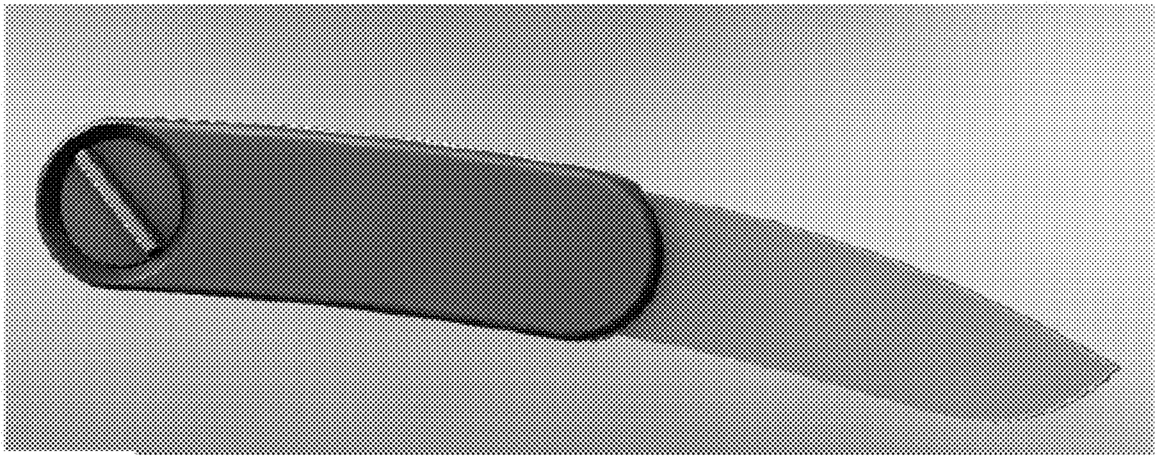
FIG. 17A is a front elevation view of another embodiment of the present invention.
Figure 17B:
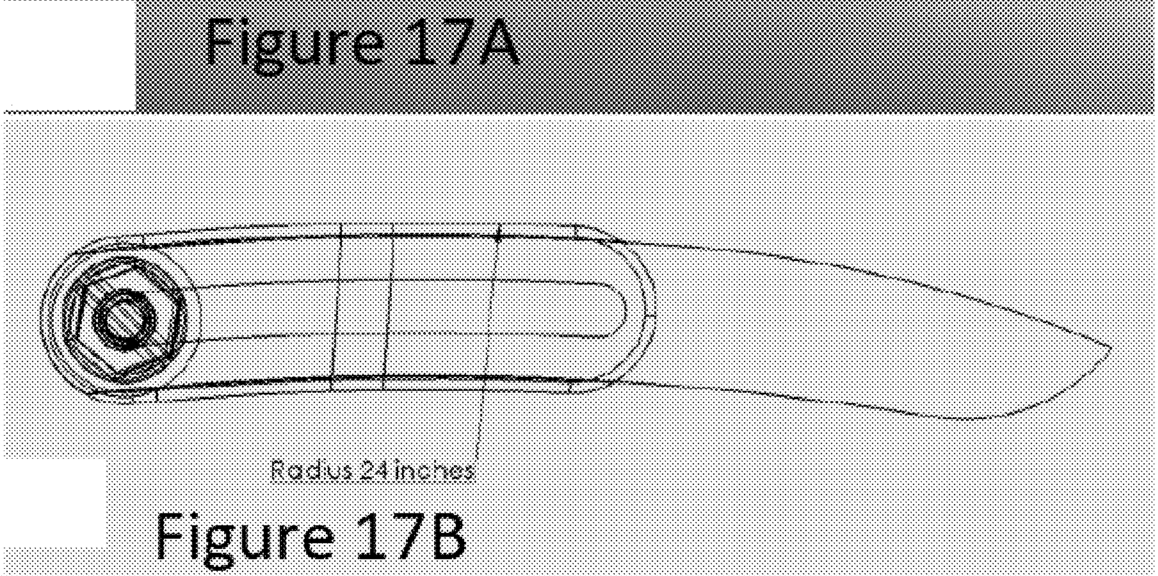
FIG. 17B is a front elevation view similar to FIG. 17A.
Figure 18A:
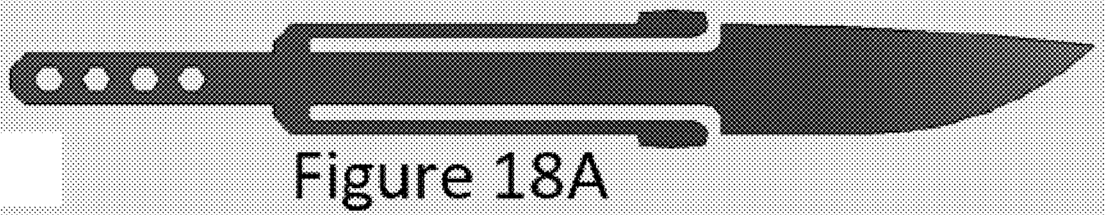
FIG. 18A is a front elevation view of the tang employed by another embodiment of the present invention.
Figure 18B:
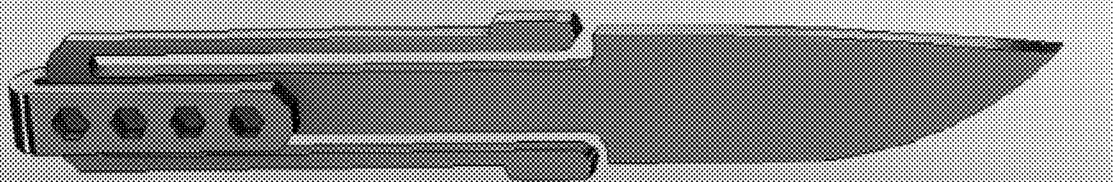
FIG. 18B is a perspective view of the tang shown in FIG. 18A.
Figure 18C:
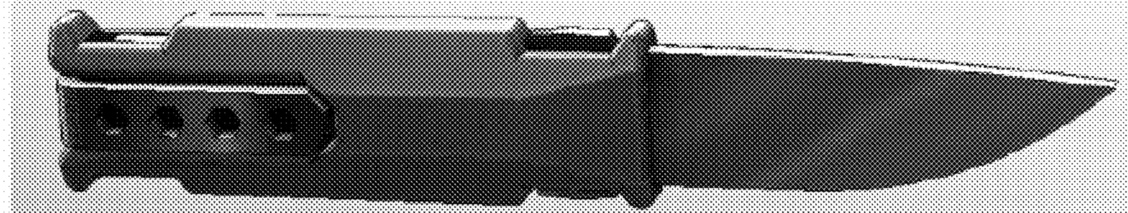
FIG. 18C is a perspective view showing a knife, wherein the tang of FIG. 18A is in a first position of use.
Figure 18D:
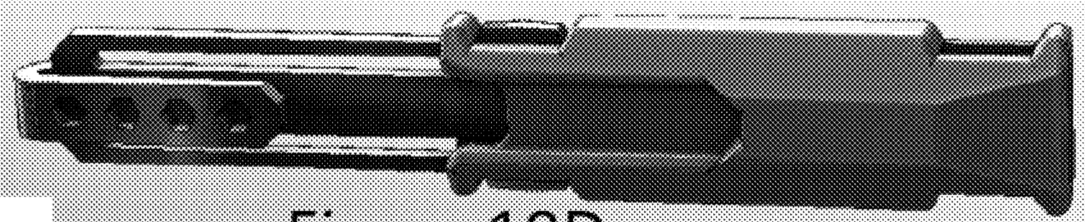
FIG. 18D is a perspective view showing the knife in FIG. 18C, wherein the tang is in a second position of use.
Figure 19A:
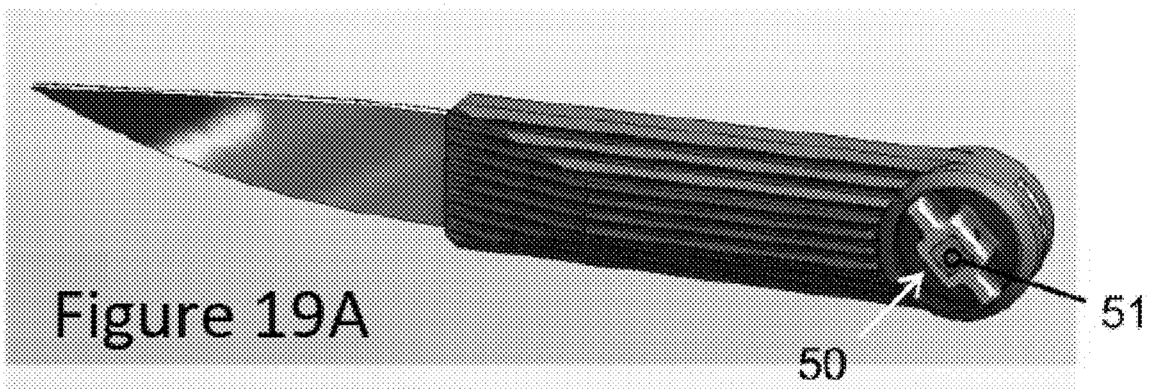
FIG. 19A is a perspective view of another embodiment of the present invention.
Figure 19B:
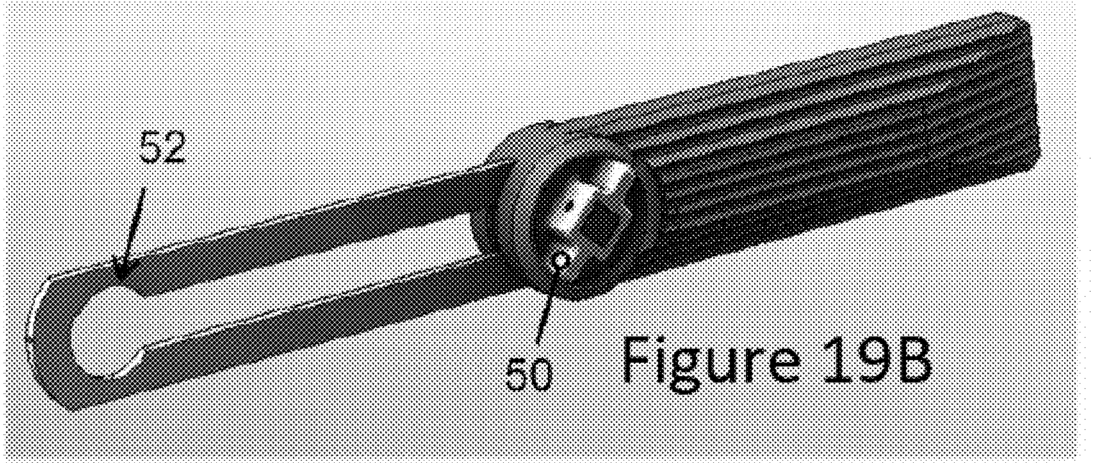
FIG. 19B is a perspective view of the embodiments shown in FIG. 19A, wherein the tang is in a second position of use.
Figure 19C:
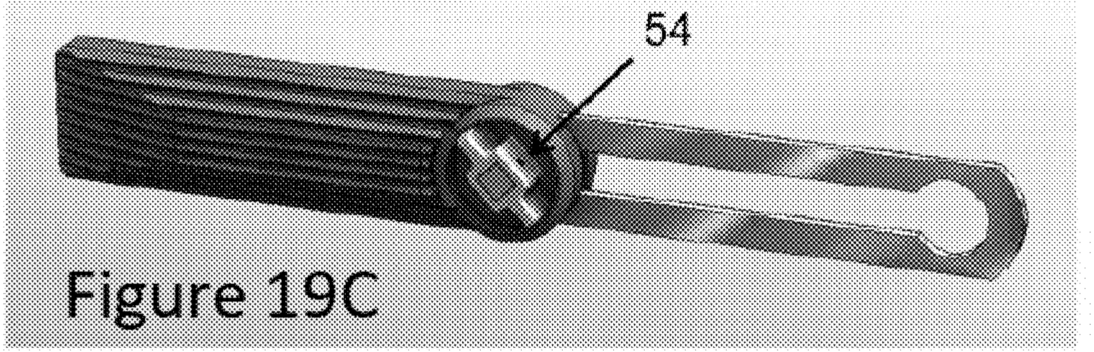
FIG. 19C is another perspective view of the embodiment shown in FIG. 19A, wherein the tang is in the second position of use.
Figure 19D:
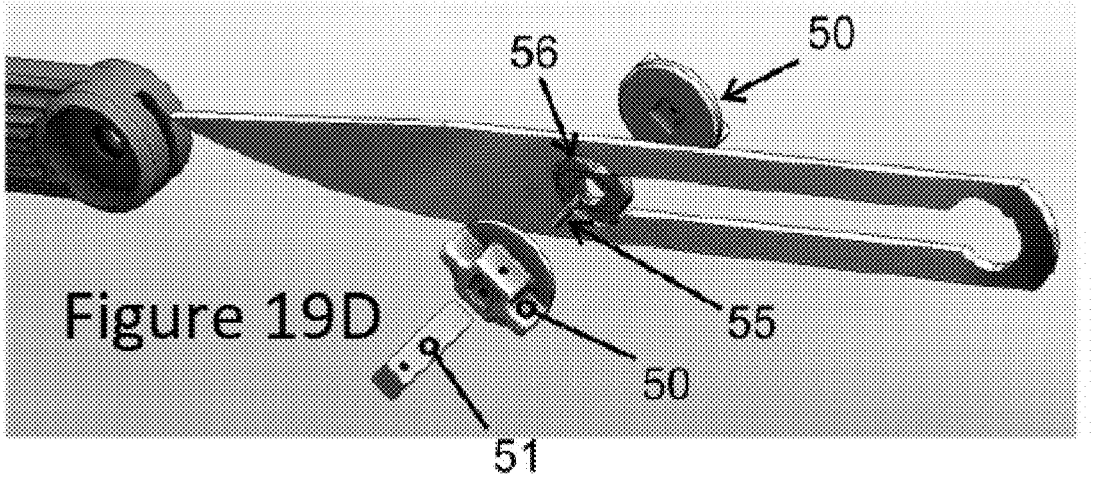
FIG. 19D is an exploded view of FIG. 19C.

FIG. 17 depicts a knife design similar to those shown above—a knife blade and tang with a handle that doubles as a sheath. The handle of this knife is slotted, which means the blade/tang is able to slide in and out of the slot located in the center of the handle. In this example, the slot and knife blade/tang are curved, rather than straight. This is meant to demonstrate that design options exist, whether for a more attractive form or for some functional advantage.

FIG. 18 illustrates a knife design that combines the "button lock" design described for FIG. 9 above and the "pocket hook" option described for FIGS. 12 through 15, above. This is meant to show that specific designs and features described in this patent application may be combined if so desired, in many circumstances. They are not necessarily limited to a specific concept model used here to demonstrate that design or feature.

FIG. 19 discloses another locking mechanism concept for the Fixed-Blade Knife with Combined Handle/Sheath. Once again, the overall design implements a slotted handle/sheath and a full tang blade. A slot in the tang defines the range of travel of the blade relative to the handle. A slot hole (52 in Frame B) may be seen at the lead and rear portions of the slot. A slot lock (56 in Frame D, which shows the various parts in an exploded view) fits in the slot hole and, when rotated properly, may also fit to slide through the narrow portion of the slot that connects the two slot holes. A slot lock pin (51) connects two thumb fittings (50), and also slides through the slot lock (56). The thumb fittings are secured to the slot lock pin (51) by means of a spring pin (55).

The mechanism works as follows. When assembled (frames A, B, and C), the knife blade is locked in either an exposed or sheathed (blade is covered by the handle/sheath) position. Locking of the blade in either position is performed by turning either of the thumb fittings, with the blade either fully exposed or fully sheathed, so that the slot lock pin (51) and the slot lock (56) turns transverse to the overall slot length.

With the slot lock trapped between the two sides of the interior of the handle and trapped within either the front or back slot hole (52), the blade cannot move relative to the handle. To insure a tight fit (blade does not move relative to the handle), the slot lock and/or the slot holes may be shaped to create a friction fit when turned to the locking position. The slot lock pin may be designed, either through material selection (such as the use of an elastomer) and/or through use of relatively thin, flexible walls of the slot lock design, so that recoverable deformation takes place when a thumb fitting is turned, and the slot lock is rotated to the transverse locking position. A tight fit is necessary to insure a firm, immovable feel of the handle/blade junction.

To create a "hard stop" for the thumb fittings, such that the user knows when the blade is locked into position, the slot holes (52, frame B) and slot lock are so designed that the slot lock may not turn past about 90 degrees relative to the tang slot.

Figure 20A:
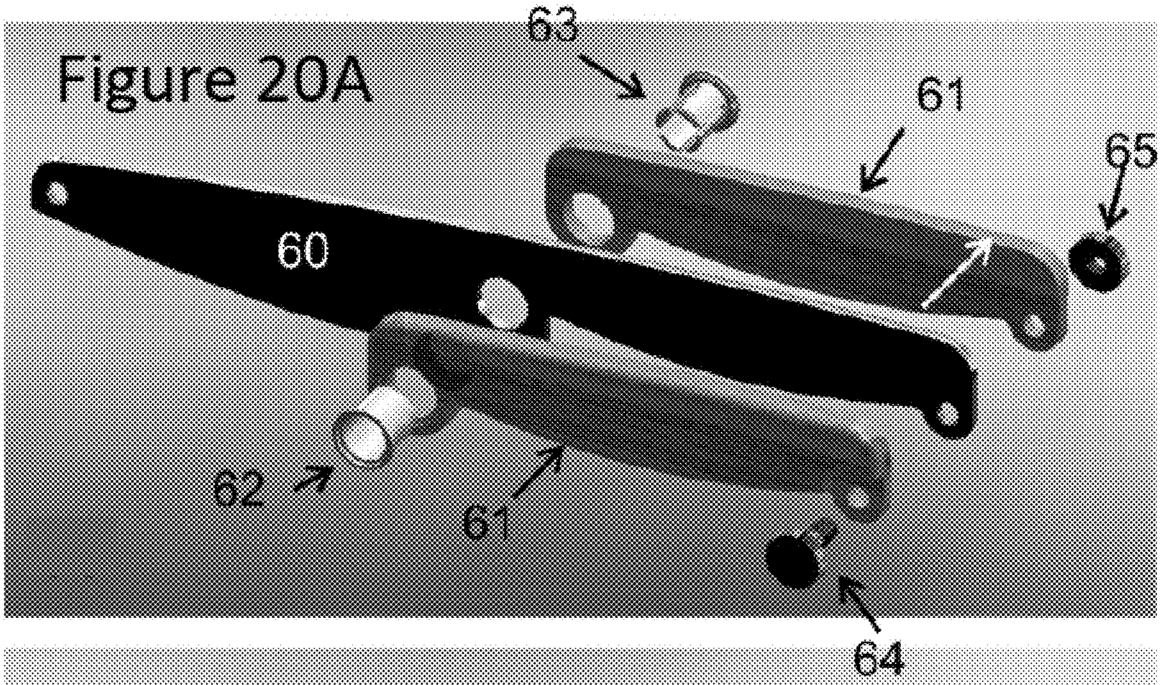
FIG. 20A is an exploded view of another embodiment of the present invention.
Figure 20B:
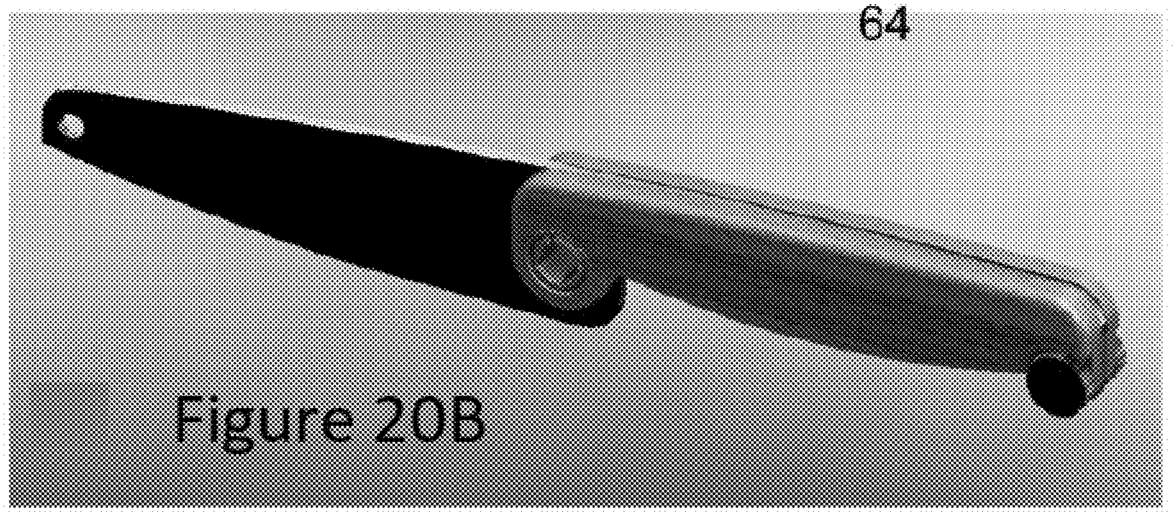
FIG. 20B is a rear perspective view of the embodiment shown in FIG. 20A.
Figure 20C:
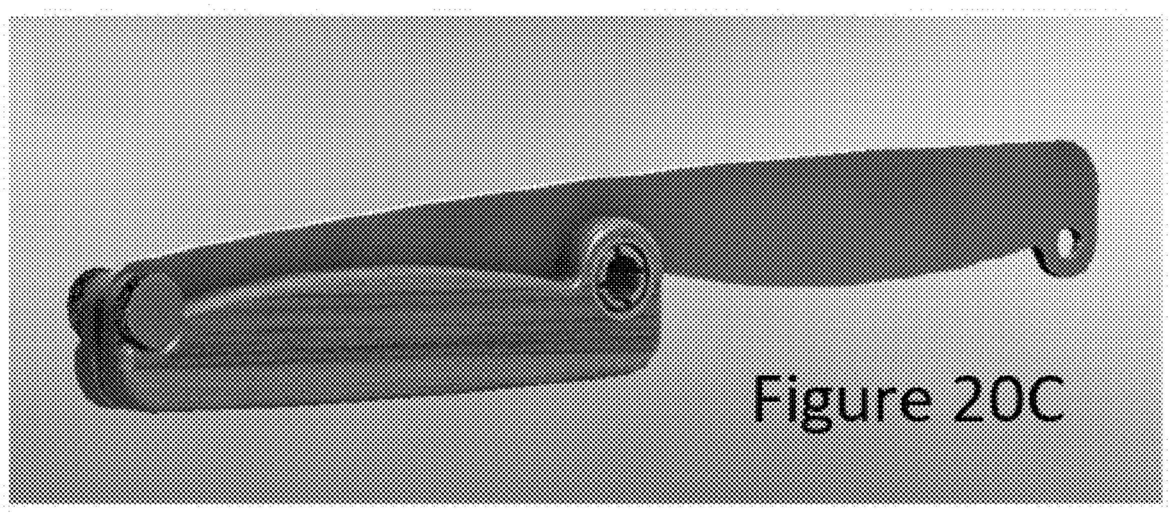
FIG. 20C is a rear perspective view of the embodiment shown in FIG. 20A.

FIG. 20 illustrates a culinary knife with a pivoting handle similar to the knife design shown in FIG. 7. Frame A shows an exploded view. A full tang blade (60) is ensconced between two handle scales (61). The handle scale pivots (63) hold the scales against the blade/tang, and permit the scales to rotate to either the handle position (Frame B) or the sheath position (Frame C). Thumb screw (64) and thumb nut (65) lock the scales into place in either position.

Figure 22:
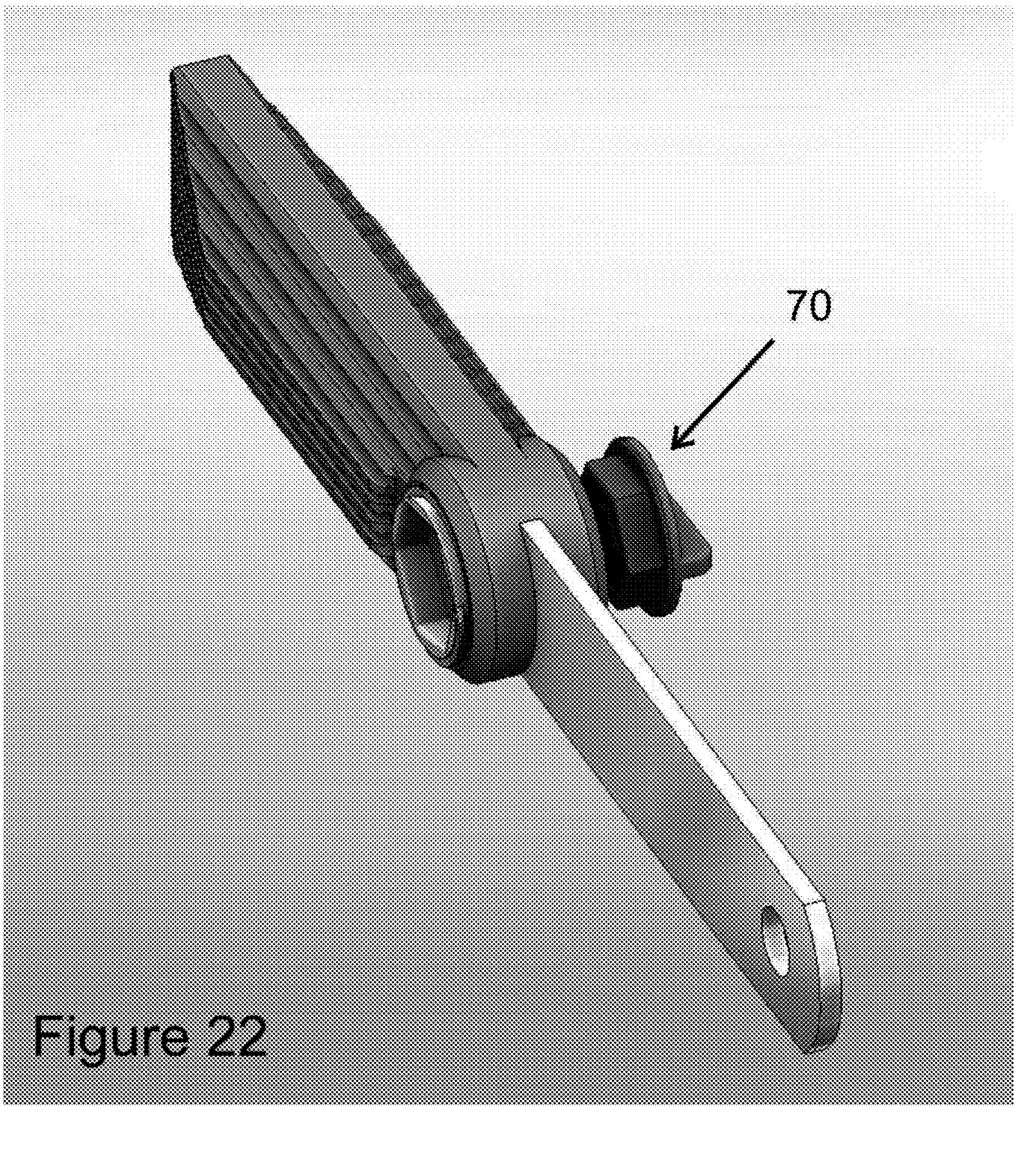
FIG. 22 is a rear perspective view of the knife shown in FIG. 21A.
Figure 23A:
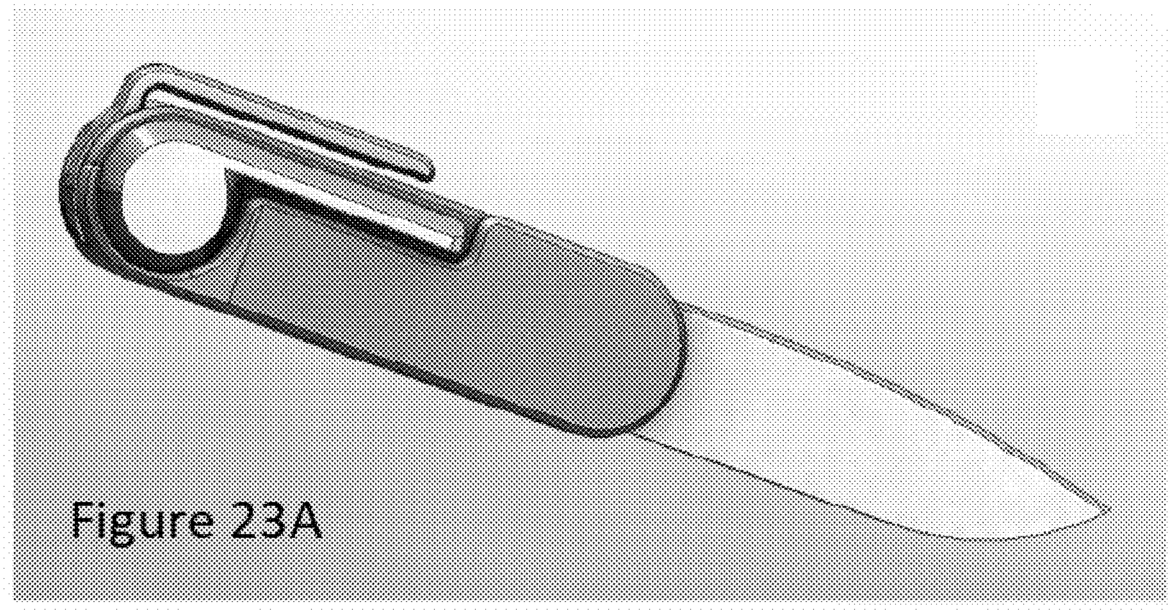
FIG. 23A is a front perspective view of a knife of another embodiment of the present invention shown in a first position of use.
Figure 23B:
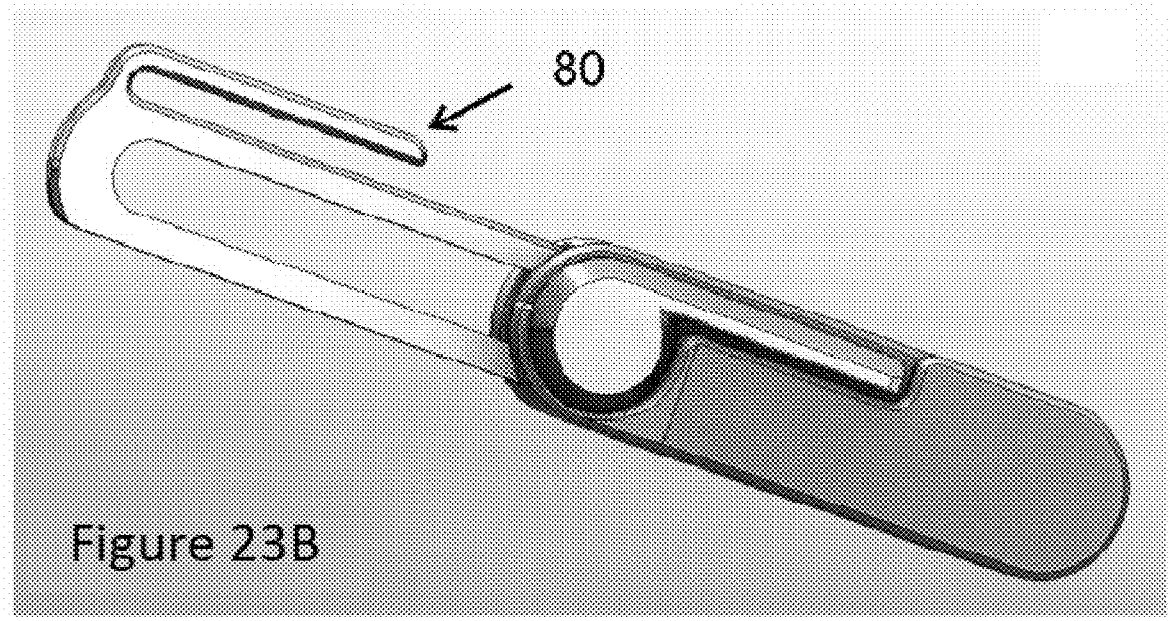
FIG. 23B is a front perspective view of the knife of FIG. 23A shown in a second position of use.
Figure 24A:
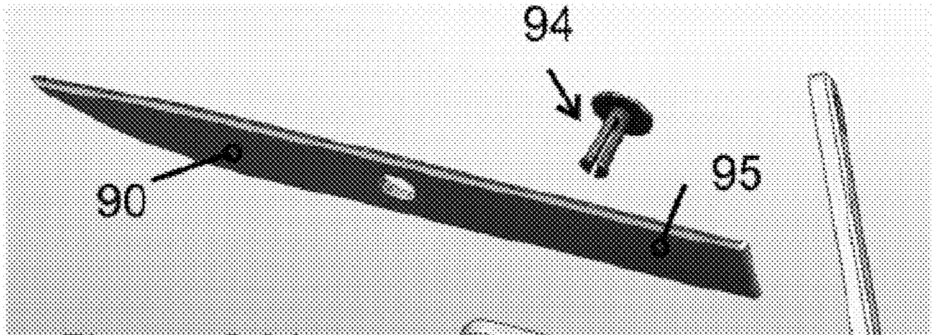
FIG. 24A is an exploded view of a knife of another embodiment of the present invention.
Figure 24B:
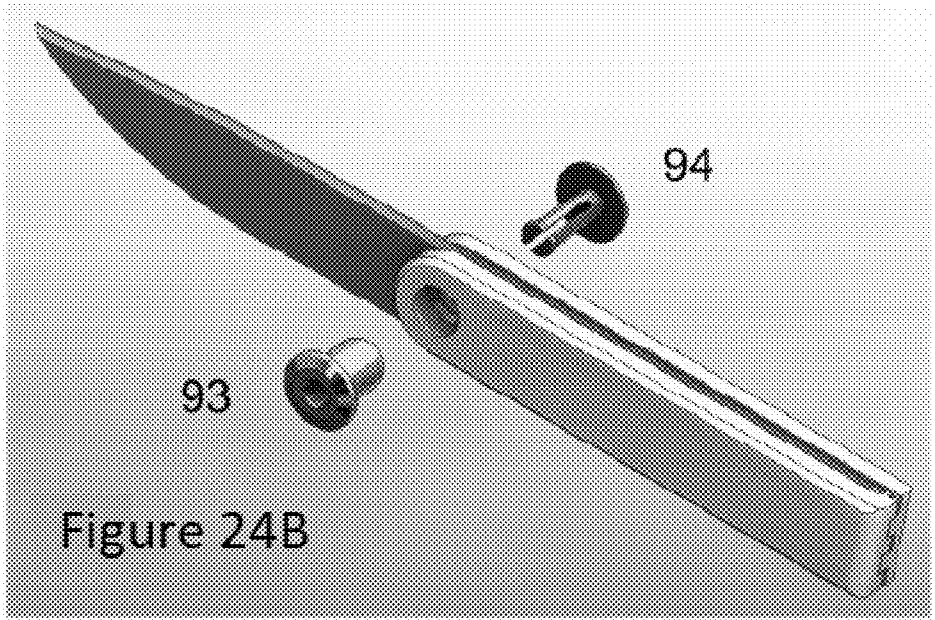
FIG. 24B is a perspective view of the knife shown in FIG. 24A.
Figure 24C:
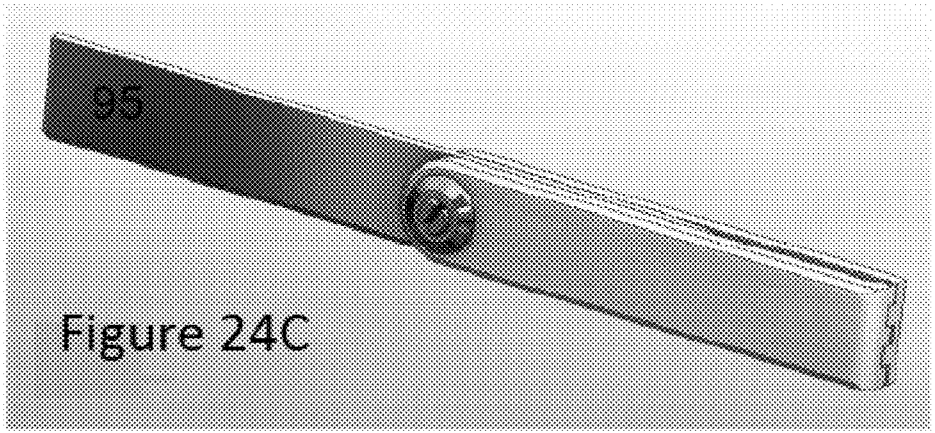
FIG. 24C is a perspective view of the knife shown in FIG. 24A.

FIGS. 21 and 22 introduce a product category that lends itself to the "Fixed-Blade Knife with Combined Handle/Sheath" design theme—a "child proof" knife. Of course there are many ways a knife may be secured away from young hands. The "handle as sheath" design motif, coupled with a child-proof locking mechanism, makes an efficient combination for a wide range of cutting and other tools. FIGS. 21 and 22 describe one possible design direction.

FIG. 21, Frame A shows a knife similar to many of those shown above, with full length blade with tang, and a slotted handle wherein the blade/tang may slide, such that the handle may function either as a handle or a sheath. Frame C in FIG. 21 shows the blade/tang (23) alone, with front and rear holes which determine the "blade exposed" and "blade sheathed" locations of the handle relative to the blade/tang. Lock screw (71, Frames A and D) threads with the handle. When assembled with blade and handle locked into place, a protrusion in the lock screw (barely visible on far side of lock screw 71 in Frame A) protrudes into either a front or rear hole in the blade/tang (73, Frame C), depending upon whether the blade is exposed or sheathed.

The lock screw (71) is designed so that it may not be screwed in or out by hand without a lock screw key (70, Frame A, B, D and E). The lock screw key has, in this design, a male hex fitting that nests with the corresponding female hex fitting of the lock screw (71). A magnet (72, Frame B and E) removeably holds the lock screw key and the lock screw together. The lock screw key has a finger grip to assist with tightening or loosening the lock screw, so that the knife blade may be unlocked from the handle. In this design, the lock screw need not be fully removed from the handle to unlock the blade.

With the blade secured in either the "open" or "sheathed" position, the lock screw key (70) may be moved to the opposite side of the knife (FIG. 22) and stored in the handle pocket (75, FIG. 21, Frame E). The magnet (72, shown through a partially transparent—for visual clarity—lock screw key in Frame E) holds the lock screw key in the pocket, assuming the lock screw is sufficiently ferromagnetic and magnet is sufficiently powerful. An N42 neodymium magnet of dimensions diameter 0.276"×thickness 0.042" provided enough force to hold the lock screw key in position when used with a ferromagnetic lock screw. If more strength is desired, magnet dimensions and/or magnet strength could be increased without compromising the assembly design. Another magnet could also be included in the design of the lock key.

With the knife blade retracted and locked in place, and the lock screw key stored in the handle pocket (75, Frame E), a curious child would spin the lock screw key with no effect, and would thereby be protected from accidental exposure to a sharp blade.

As may be seen, similar child-proof mechanisms such as are found on medicine and mouthwash bottles may be readily applied to fit within the scope of the "Fixed-Blade Knife with Combined Handle/Sheath" concept.

It may be seen from this disclosure that the inventions described herein meet the need for a knife which:

avoids the inherent structural weakness and "worn pivot" problem of folding knives, can be a sturdy, "one hand" EDC, can be lighter in weight than a knife/sheath combination of similar size, offers an alternative to the hunting knife "sheath-on-belt" look, may be cleaned and serviced more easily than folding knives, can be made more simply, with fewer parts than a folding knife. In addition, the "fixed-blade knife with combined handle/sheath" concept lends itself well to improvements in knife safety around children, as the knife and handle may be locked in such a way that children cannot access the blade but adults can.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase “A or B” will be typically understood to include the possibilities of “A” or “B” or “A and B.”

The foregoing detailed description has set forth various embodiments of the devices and/or processes via the use of diagrams and examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like “responsive to,” “related to,” or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A knife assembly comprising:

a knife member having a blade portion and a tang portion, the knife member having a proximal end associated with an end of the tang portion and a distal end associated with a tip of the blade portion, wherein the proximal end and the distal end define a longitudinal axis of the knife member, the knife member also having a slot extending along at least a portion of the longitudinal axis;

a handle member configured to slidingly receive the knife member, the knife assembly having a first position of use wherein a majority of the blade portion is concealed by the handle member and a second position of use wherein a portion of the blade portion extends from the handle member;

a locking member associated with a first lateral side of the handle member and, the locking member comprising a rotatable portion with a threaded member, which extends in a direction generally perpendicular to the longitudinal axis, the threaded member operatively interconnected to an adjusting nut associated with a second lateral side of the handle member, the adjusting nut configured to freely rotate relative to the second lateral side of the handle member, and wherein selective rotation of the rotatable portion urges the locking member against the knife member, thereby securing the knife member relative to the handle member in at least the first position of use and the second position of use; and a lock nut selectively interconnected to the adjusting nut, the lock nut being selectively interconnected to the second lateral side of the handle member and fixed thereto, wherein the adjusting nut is positioned within the lock nut and captured thereby such that the adjusting nut is fixed relative to the lock nut.

2. The knife assembly of claim 1, wherein the handle member includes a channel configured to accept the knife member therein, wherein in the first position of use, the distal end is concealed within the handle member.

3. The knife assembly of claim 1, wherein the handle member includes a channel configured to accept the knife member therein.

4. The knife assembly of claim 1, wherein the knife member includes a clip member configured to attach the knife assembly to an object when in the first position of use.

5. The knife assembly of claim 1, wherein the knife member forms a full tang knife when the knife assembly is in the second position of use.

6. The knife assembly of claim 1, wherein knife member has a radius of curvature.

7. The knife assembly of claim 1, wherein the slot is only located in the tang portion.

8. The knife assembly of claim 1, further comprising a third position of use, wherein the knife member is locked between the first and second positions of use.

9. A knife assembly comprising:

a knife member having a blade portion and a tang portion, the knife member having a proximal end associated with an end of the tang portion and a distal end associated with a tip of the blade portion, wherein the proximal end and the distal end define a longitudinal axis of the knife member, the knife member also having a slot extending along at least a portion of the longitudinal axis;

a handle member configured to slidingly receive the knife member, the knife assembly having a first position of use wherein a majority of the blade portion is concealed by the handle member and a second position of use wherein a portion of the blade portion extends from the handle member; and a locking member associated with a first lateral side of the handle member and, the locking member comprising a rotatable portion with a bolt extending therefrom in a direction generally perpendicular to the longitudinal axis, the bolt operatively interconnected to an adjusting nut associated with a second lateral side of the handle member, the adjusting nut configured to freely rotate relative to the second lateral side of the handle member, and wherein selective rotation of the rotatable portion urges the locking member against the knife member, thereby securing the knife member relative to the handle member in at least the first position of use and the second position of use; and a lock nut selectively interconnected to the adjusting nut, the lock nut being selectively interconnected to the second lateral side of the handle member and fixed thereto, wherein the adjusting nut is positioned within the lock nut and captured thereby such that the adjusting nut is fixed relative to the lock nut.

10. The knife assembly of claim 9, wherein the knife member includes a clip member configured to attach the knife assembly to an object when in the first position of use.

11. The knife assembly of claim 10, wherein the clip member is integrated into the tang portion.

12. The knife assembly of claim 11, wherein the clip member is configured as a belt clip.

13. The knife assembly of claim 9, wherein the handle member includes a channel configured to accept the knife member therein, wherein in the first position of use, the distal end is concealed within the handle member.

14. The knife assembly of claim 9, wherein the slot is only located in the tang portion.

* * * * *